(12) United States Patent
Kang et al.

(10) Patent No.: US 12,106,697 B2
(45) Date of Patent: Oct. 1, 2024

(54) IMAGE DISPLAY DEVICE, SYSTEM AND METHOD

(71) Applicant: Atmoph Inc., Kyoto (JP)

(72) Inventors: Kyohi Kang, Kyoto (JP); Kyohei Nakano, Kyoto (JP); Yoko Tarui, Kyoto (JP); Shin Sugiyama, Kyoto (JP); Takashi Kubota, Kyoto (JP); Kwei Yuan Chiou, Osaka (JP)

(73) Assignee: ATMOPH INC., Kyoto (JP)

( * ) Notice: Subject to any disclaimer, the term of this patent is extended or adjusted under 35 U.S.C. 154(b) by 0 days.

(21) Appl. No.: 17/896,763

(22) Filed: Aug. 26, 2022

(65) Prior Publication Data

US 2022/0415244 A1 Dec. 29, 2022

Related U.S. Application Data

(63) Continuation-in-part of application No. PCT/JP2021/007586, filed on Feb. 27, 2021.

(51) Int. Cl.
*G09G 3/20* (2006.01)
*G06F 3/01* (2006.01)
*G06F 3/14* (2006.01)

(52) U.S. Cl.
CPC .......... *G09G 3/2096* (2013.01); *G06F 3/011* (2013.01); *G06F 3/1446* (2013.01); *G06F 3/1431* (2013.01); *G09G 2340/0478* (2013.01); *G09G 2354/00* (2013.01); *G09G 2356/00* (2013.01);
(Continued)

(58) Field of Classification Search
CPC ......... G09G 3/2096; G09G 2340/0478; G09G 2354/00; G09G 2356/00; G09G 2360/04; G09G 2370/027; G09G 2340/0464; G06F 3/011; G06F 3/012; G06F 3/013; G06F 3/015; G06F 3/016; G06F 3/017; G06F 3/1446; G06F 3/1431; G06F 3/1423;
(Continued)

(56) References Cited

U.S. PATENT DOCUMENTS 9,179,182 B2 * 11/2015 Huebner ................. G06F 3/016
10,049,477 B1 * 8/2018 Kokemohr ............. G06T 11/60
10,375,353 B2 * 8/2019 Sakai ..................... H04N 7/147
(Continued)

FOREIGN PATENT DOCUMENTS

CN 108370431 A 8/2018
JP 2011-113206 A 6/2011
(Continued)

OTHER PUBLICATIONS

International Search Report issued in PCT/JP2021/007586 mailed on Jun. 1, 2021 with English Translation (5 pages).
(Continued)

*Primary Examiner* — Vijay Shankar
(74) *Attorney, Agent, or Firm* — GREENBLUM & BERNSTEIN, P.L.C.

(57) ABSTRACT

Image display device and method have a display arranged at a user's preferred position and displaying images with comfortable image quality and arrangement that match a user's viewing position and preference. The image display device includes an external input interface, a memory for storing image data, an arithmetic processing unit, a graphics processing unit, a display, and a setting mode suitable for the user.

18 Claims, 20 Drawing Sheets

(52) U.S. Cl.
CPC ... *G09G 2360/04* (2013.01); *G09G 2370/027* (2013.01)

(58) Field of Classification Search
CPC .......... G06F 3/147; H04M 11/00; H04N 7/14; H04N 21/442
See application file for complete search history.

(56) References Cited

U.S. PATENT DOCUMENTS

| | | | |
|---|---|---|---|
| 11,556,915 B2* | 1/2023 | de la Cropte de Chanterac et al. | H04W 52/0274 |
| 2012/0262487 A1* | 10/2012 | Huebner | G06F 3/1423 345/157 |
| 2015/0279037 A1 | 10/2015 | Griffin et al. | |
| 2018/0332254 A1 | 11/2018 | Sakai et al. | |
| 2019/0327446 A1 | 10/2019 | Sakai et al. | |

FOREIGN PATENT DOCUMENTS

| | | |
|---|---|---|
| JP | 5050120 B1 | 10/2012 |
| JP | 2013-546042 A | 12/2013 |
| JP | 2014-176053 A | 9/2014 |
| JP | 5893737 B2 | 3/2016 |
| JP | 2018-152155 A | 9/2018 |
| JP | 2019-92152 A | 6/2019 |
| WO | 2017/098780 A1 | 6/2017 |

OTHER PUBLICATIONS

Written Opinion of International Searching Authority issued in PCT/JP2021/007586 mailed on Jun. 1, 2021 with English Translation (10 pages).

Office Action issued in Chinese patent application No. 202180011777.6 dated Apr. 22, 2024, together with an English translation.

* cited by examiner

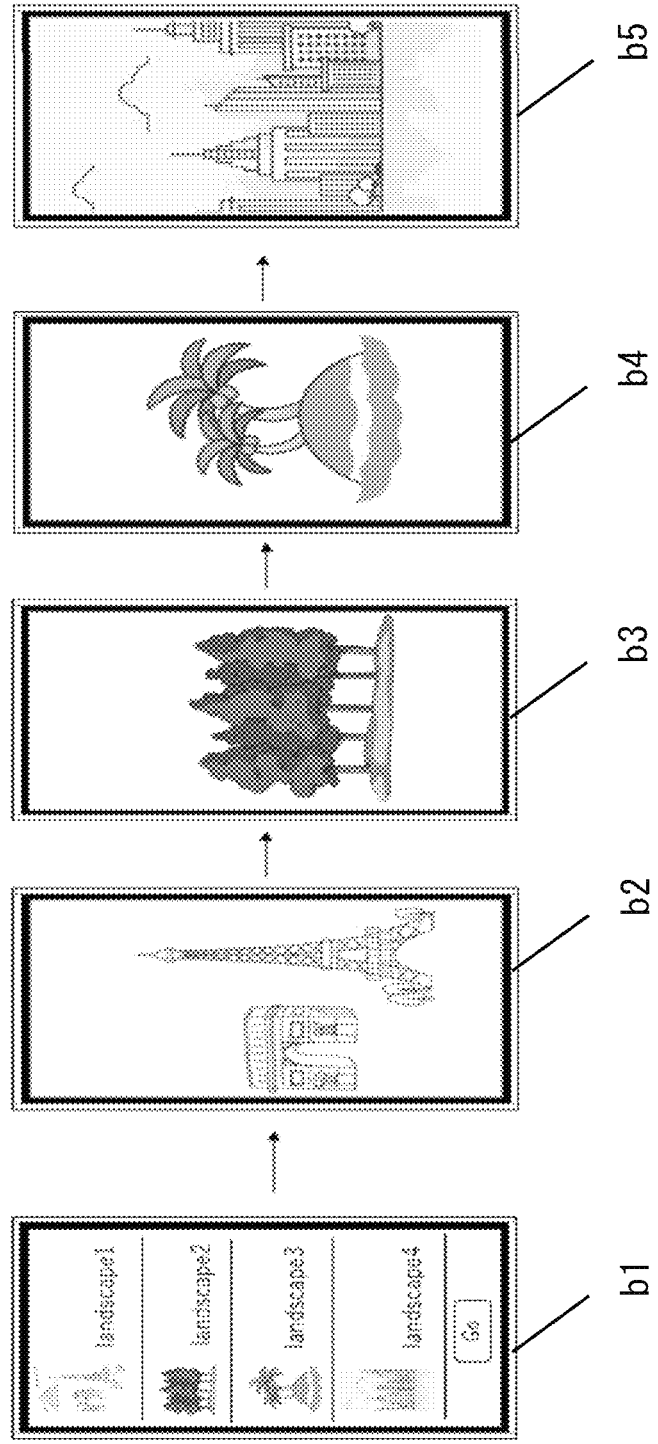

FIG. 11A
FIG. 11B
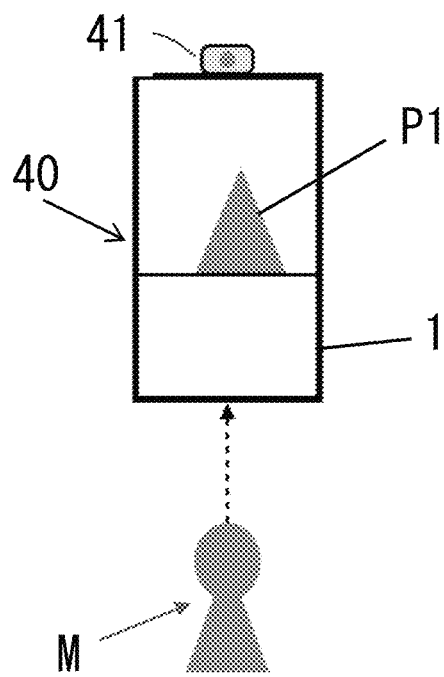
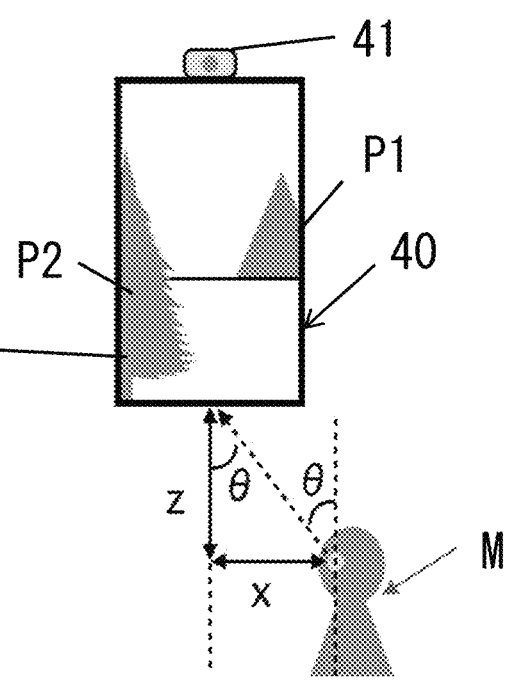
FIG. 11C
FIG. 11D
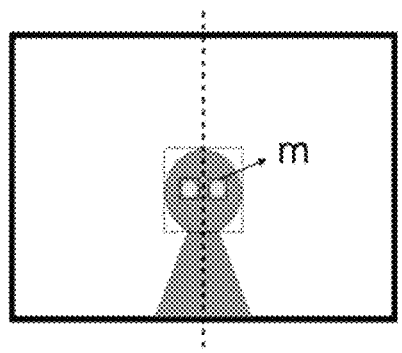
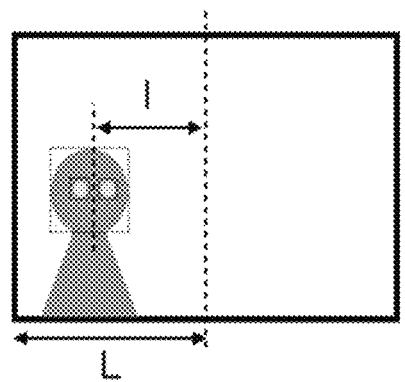

IMAGE DISPLAY DEVICE, SYSTEM AND METHOD

CROSS REFERENCE TO RELATED APPLICATION

This application is a continuation-in-part application which claims priority from PCT Application No. PCT/JP2021/007586, titled "IMAGE DISPLAY DEVICE, SYSTEM, AND," filed on Feb. 27, 2021.

The entire contents of the above applications, which the present application is based on, are incorporated herein by reference.

BACKGROUND OF THE INVENTION

1. Field of the Invention

The present disclosure relates to an image display device and method with user-preferred image reproduction and arrangement functions.

2. Description of the Related Art

Conventionally, as an image display device that reproduces a user's favorite image, there has been proposed a video recording/reproducing device that allows a user to transmit a command from a home audio-visual device to watch a desired movie via a network.

Also there has been proposed a method including of capturing an image of a consumer with a video camera, biometrically scanning the image to determine if the biometric has been recognized from the scanning, if the biometric is recognized from the scanning, accessing a database containing biometrics associated with at least one of browsing history, purchase history, and preference data associated with the consumer, and displaying on a display device an advertising image consistent with data stored in a database by a system.

There has been also proposed a stereoscopic image display device that displays on a display panel a viewing zone image showing whether or not a viewer is positioned in the viewing zone based on a distance from the display device to the viewer and the position of the viewer detected by the tracking unit as a display device that uses tracking of the viewer's part such as a face As a conventional method of controlling a plurality of displays to display divided images on the plurality of displays, there has been proposed such that a host controller receives from a first display a first display state indicative of the state of display of a first portion of an image by the first display and a second display state indicative of the state of display of a second portion of an image by a second display.

SUMMARY OF THE INVENTION

The present disclosure provides an image display device and method having a display that is placed at a user's preferred position and displays an image with comfortable image quality and arrangement that match a user's viewing position and preference.

As one aspect, the present disclosure provides an image display device that includes an external input interface, a memory that stores image data, an arithmetic processing unit, a graphics processing unit, a display, and a setting mode suitable for a user.

As another aspect, the present disclosure provides an image display device and a display method using the device provided with a user data file related to a user output from the image display device, a server connected to an internet, and an internet data file of predetermined data obtained from the internet, wherein the server includes an estimation function for outputting recommended landscape (or scenery) image data that the user likes based on a predetermined algorithm in response to or based on input of the data in the user data file and the internet data file.

As another aspect, the present disclosure provides an image display device and a display method using the device provided with a display for displaying images, a memory for storing images, an internet interface for reading image data stored on an internet, a decoding chip, and a video memory, wherein video data stored in the memory and/or the internet is read, the read video data is decoded by the decoding chip in accordance with the format of the video data, and a frame image generated by decoding each video frame is stored in the video memory, and the frame images stored in the video memory are sequentially displayed on the display for each video frame.

As another aspect, the present disclosure provides an image display device and a display method using the device provided with the display for displaying a desired landscape (or scenery), a unit of setting a spatial information of the landscape, a unit of receiving a notification from the outside, and a unit of receiving an external notification, a unit of mapping the external notification to an object that may be inserted into an image space, and a unit of dynamically inserting the object into an image.

As another aspect, the present disclosure provides an image display device and a display method using the device provided with a camera for recognizing the position of a viewer in front of the display and a computer graphics generation unit of generating an image of the display, wherein a display image of the display is moved in conjunction with the movement of a predetermined part of the viewer.

As another aspect, the present disclosure provides an image display device and a display method using the device provided with a plurality of displays arbitrarily arranged, an electronic device for acquiring an image on the plurality of displays, a unit of detecting a position of the plurality of displays in the acquired image, and a unit of clipping images from the detected positions of the plurality of displays and displaying them on the displays. The clipped images may be synchronously displayed on the display at each detected location.

According to the present disclosure, for example, a display may be arranged at a user's favorite position such as a wall, and an image may be displayed on the display with comfortable image quality and arrangement that matches the user's viewing position and preference.

BRIEF DESCRIPTION OF THE DRAWINGS

FIG. 3B shows a landscape video image sequentially displayed on the landscape video recording/reproducing device as another example of the present embodiment.

FIG. 9 shows a display as examples of addition of spatial information to images displayed on the display as an embodiment of the present disclosure, in which

FIG. 10 shows examples of images of external notification incoming on the display of FIG. 9, in which

FIGS. 11A and 11B show front views of a display in which an image is displayed depending on the position of a person in front of an image display device and FIGS. 11C and 11D show a person's camera view as an embodiment of the present disclosure;

FIGS. 13A and 13B show images as an embodiment of the present disclosure in which FIG. 13A shows an explanatory view of clipping display using position detection of a plurality of displays, and FIG. 13B shows a view of the clipped image displayed on the plurality of displays in FIG. 13A, FIGS. 14A and 14B show a detection method as an example of the present embodiment, in which

FIGS. 15A and 15B show arrangement of displays as an example of the present embodiment, in which FIG. 15A shows an initial arrangement state of a plurality of displays, and FIG. 15B shows an explanatory diagram of movement detection of the plurality of displays;

FIGS. 16A and 16B show an arrangement of displays as an example of this embodiment, in which FIG. 16A shows an explanatory diagram of changing the magnification of a clipped image and an explanatory diagram of a method of detecting relative distances among a plurality of displays, and FIG. 16B shows an explanatory diagram of a leader display and a follower display;

FIGS. 17A and 17B show front views of an image display device as one embodiment of the present disclosure, in which FIG. 17A shows a display displaying a menu when a person is present, and FIG. 17B shows the display not displaying the menu when no one is present;

FIGS. 18A and 18B show front views of an image display device as one embodiment of the present disclosure, in which FIG. 18A shows a front view of the image display device displaying a position selected by a person, and FIG. 18B shows an image of the image display device that is selected by the person;

DETAILED DESCRIPTION

Figure 1:
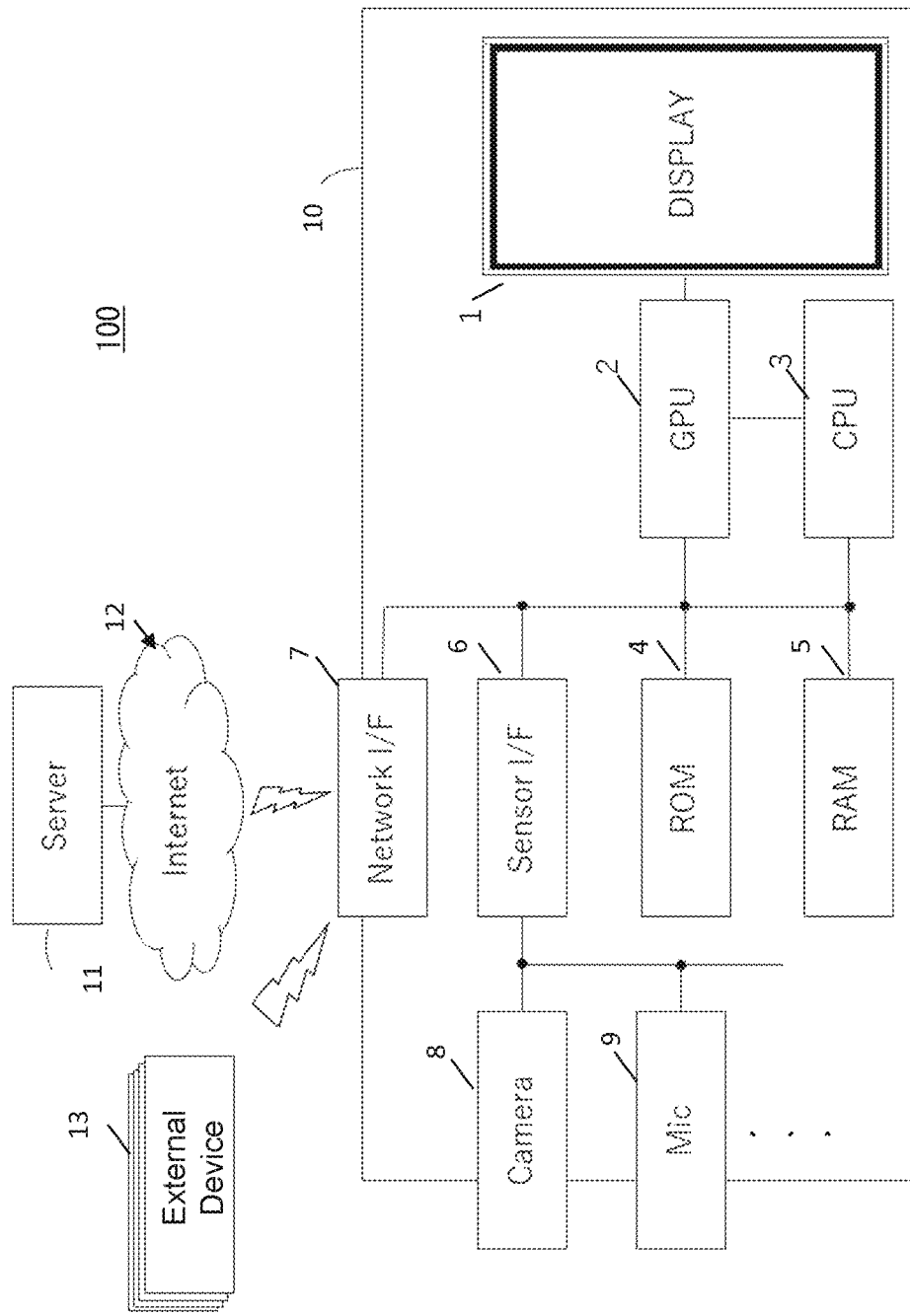
FIG. 1 shows a simplified block configuration diagram of a landscape video recording/reproducing system as one embodiment of the present disclosure.

Hereinafter, embodiments of the present disclosure will be described with reference to the drawings. In the following description, the same parts and components are given the same reference numerals. The present disclosure includes, for example, the following configurations:

[Configuration 1]

An image display device including an external input interface (7), a memory (4) for storing image data, an arithmetic processing unit (3), a graphics processing unit (2), a display (1), and a setting mode suitable for a user. This device may include image quality settings suitable for the user, external notification incoming call notification settings, and settings for arbitrarily arranging a plurality of displays and split-displaying images.

[Configuration 2]

A landscape (or scenery) video recording/reproducing system (or an image display system) including a landscape video recording/reproducing unit (or an image display device) (10), a user data file (DATA-A) related to a user output from the landscape video recording/reproducing unit (10), a server (11) connected to an internet, and an internet data file (DATA-B) of predetermined data to be obtained from the internet, wherein the server includes an estimation function unit of outputting recommended landscape image data (DATA-C) preferred by a user based on a predetermined algorithm in response to or based on data input of the user data file (DATA-A) and the internet data file (DATA-B). The server (11) includes an arithmetic unit. The server (11) may be an external server, and a part or all of the function unit of the server may be built into the landscape video recording/reproducing unit (10). The server or the like may estimate, infer, or predict based on a predetermined algorithm. The server may also utilize AI (artificial intelligence).

[Configuration 3]

A landscape video recording/reproducing device (or an image display device) (10) includes a display (1), wherein the landscape video recording/reproducing device (10) includes a user data file (DATA-A) associated with a user, a server (11) connected to an internet, and an internet data file (DATA-B) of predetermined data obtained from the internet, wherein device (10) is provided with an estimation function for outputting recommended landscape image data (DATA-C) preferred by the user based on a predetermined algorithm according to or based on data input of the user data file (DATA-A) and the internet data file (DATA-B). By incorporating the server (11) into the landscape video recording/reproducing device (10), for example, the estimation function may be improved without being affected by external communication circumstances.

[Configuration 4]

A landscape video recording/reproducing method (or an image display method) includes the steps of creating a user data file (DATA-A) associated with a user from a landscape video recording/reproducing device (10), creating an internet data file (DATA-B) of predetermined data obtained from an internet, and outputting recommended landscape image data (DATA-c) preferred by the user based on a predetermined algorithm according to or based on input of data in the user data file (DATA-A) and the internet data file (DATA-B).

[Configuration 5]

The user data file (DATA-A) may include at least one information of user information, a landscape or scenery browsing history, an operation history; user status captured by a camera, a microphone, a sensor, etc.; installation environment status obtained using a camera, a microphone, a sensor, a radio wave condition, etc.; and location information of an installation location of the landscape video recording/reproducing unit. In some embodiments, the internet data file (DATA-B) may contain at least one information of date and time, season, time information, weather, map information, calendar information, user SNS information, news, and landscape information when recommended landscape is generated from the server,

[Configuration 6]

An image player (or an image display device) including a display (1) for displaying an image, a memory (4) for storing an image, an internet interface (7) for reading video data stored on an internet (12), a decoding chip (14), and a video memory (28), wherein the image player is configured to read video data stored in the memory (4) and/or the internet (12), decode (27) the read video data by the decoding chip (14) according to a format of the video data, store the decoded frame image of each video frame (F1, F2, . . . ) in the video memory (28), and display the frame image stored in the video memory (28) on the display (1) in sequence for each of the video frames (F1, F2, . . . ).

[Configuration 7]

An image display method including the steps of reading video data stored in a memory of an image player and/or video data stored on an internet, decoding the read video data according to a format of the video data, storing the decoded frame image in each video frame, and displaying the frame image on the image player in order for each of the video frame.

[Configuration 8]

The image player (10) according to the configuration 6, further including a random access memory (5) for storing the decoded frame image, wherein the frame image stored in the random access memory (5) is performed with a first image processing (29), the frame image after the first image processing is stored in the video memory (28), and the frame image stored in the video memory (28) is performed with a second image processing (30) is performed on the image, whereby the frame image after the second image processing is displayed on the display (1).

[Configuration 9]

An video reproducing method (or image display method) including the steps of reading video data stored in a memory of an image player (10) and/or video data stored on an internet (12), decoding (27) the read video data (26) into a frame image according to a format of the video data, storing the decoded frame image in each video frame (F1, F2, . . . ), and displaying the frame image on the image player (10) in order in each video frames (F1, F2, . . . ). The video reproducing method further including a step of correcting an entire image to a more preferable color tone, a virtual window type display that displays images as if a landscape is reflected in a window, and a step of synthesizing a predetermined favorite glass window image with a landscape image. An image reproducing device (10) for executing the image reproducing method.

[Configuration 10]

A video (or image) player (or an image display device) is provided with a unit that adjusts an image quality in real time when playing back landscape images based on image quality or characteristics of landscape images, image quality or error of a display, surrounding environment information obtained from sensors, information set by the user, preferred image quality information estimated from past statistical information. An image display method of displaying by using the image display device. In some embodiments, a GPU or dedicated chip may be utilized in addition to a CPU so as not to drop the frame rate. This makes it possible, for example, to reduce the heavy load of real-time image processing of video.

[Configuration 11]

A display method including the steps of displaying a desired scene on a display (1), setting spatial information of the scene, receiving an external notification, mapping the external notification to an object that may be inserted into a video space and dynamically inserting the object into a video. Objects may be animated or may be still images. In some embodiments, the dynamic insertion of objects may be at least one of fade-in, slide-in, and slow-in.

[Configuration 12]

A display device includes a display (1) for displaying a desired scene, a unit of setting spatial information of the scene, a unit of receiving an external notification, a unit of mapping the external notification to an object that may be inserted into a video space. and a unit of dynamically inserting the object into a video or an image. A display method using the display device.

[Configuration 13]

A method of displaying an image on an image display device (40) including a display (1), a camera (41) and a computer graphics generation unit, the method including the steps of recognizing the position of a viewer in front of the display (1) by the camera (41), and moving the display image of the display (1) in conjunction with the movement of a predetermined part of the viewer;

[Configuration 14]

An image display device includes a display, a camera that recognizes a position of a viewer in front of the display, a computer graphics generation unit of generating an image of the display, whereby a display image of the display is moved in conjunction with a movement of the viewer's predetermined part.

[Configuration 15]

The method according to the configuration 13, including the steps of tracking a movement of the viewer's predetermined part and setting a virtual camera (42) of the camera (41) on computer graphics in accordance with the position of the viewer, and displaying on the display (1) a landscape image seen from the virtual camera (42). The predetermined parts of the viewer may be any or a combination of face, eyes, and other body part.

[Configuration 16]

An image display device includes a display (1), a camera (41) for recognizing a position of a viewer in front of the display (1), and a computer graphics generation unit of generating an image of the display (1), wherein the image display device is configured to move an image displayed on the display (1) in conjunction with movement of a predetermined portion of the viewer.

[Configuration 17]

An image display device includes
- a display for displaying an image of a landscape,
- a camera that recognizes a position of a person by face tracking based on a distance and angle between the eyes of the person in front of the display and the display,
- a memory for storing image data,
- a processing unit, and
- a computer graphics image processing unit that generates an image to be displayed on the display, wherein a virtual camera corresponding to the camera is placed at a position of the person on the computer graphic image including the landscape, an image of the landscape seen from the virtual camera is displayed on the display, and a landscape hidden in the display is displayed on the display by moving the display image of the display in conjunction with a parallel movement of the person in front of the display.

An image display method of displaying by using the image display device.

[Configuration 18]

A display method includes the steps of detecting positions of a plurality of arbitrarily arranged displays in an image acquired from an outside, clipping an image by using the detected positions of the displays, and synchronously displaying clipped images on the displays at the detected positions.

[Configuration 19]

The image display method according to the configuration 15, further includes the steps of setting one of the plurality of displays as a leader display and setting the other display(s) as a follower display, transferring reproducing position information of the leader display to the follower display(s), and clipping and displaying the same video on each of the plurality of displays when the follower display receives the reproducing position information from the leader display,

[Configuration 20]

An image display system includes a plurality of arbitrarily arranged displays, an electronic device that acquires images in the plurality of displays, a unit that detects positions of the plurality of displays in the acquired images, and a unit that clips an image at the detected positions of the plurality of displays and display the clipped image on the displays.

The following embodiments describe a landscape video recording/reproducing device as an example of the present disclosure. However, the present disclosure is not limited to landscape video recording/reproducing devices, and may also be applied to image display devices or video (or image) players For example, FIG. 1 is a simplified block diagram of a landscape video recording/reproducing system (or an image display system) as one embodiment of the present disclosure. The landscape video recording/reproducing system 100 includes a video recording/reproducing device (or an image display device) 10, an internet 12 connected to a server 11, and an external device 13, which are wirelessly connected to each other.

The external device 13 may be, for example, a smart device that may connect to and cooperate with a wireless communication system such as Wi-Fi/BT, and may use a device that may connect to the internet, such as a smart phone, smart speaker, smart display, or PC. The smartphone may be configured to perform basic operations such as landscape operations, and the smart speaker may be configured to emit sound from a preferred position. In addition to wireless communication equipment, a control device such as an infrared remote controller may be used.

The video recording/reproducing device 10 is configured to include a display 1, a GPU (graphics processing unit) 2 for displaying video on the display 1, a CPU 3, a ROM 4, a RAM 5, a sensor interface 6 (USB, SPI, I2C, UART, CAN, etc.) for attaching various sensors such as a camera 8, a microphone 9, etc. (other sensors are not shown). a, a network interface 7 (Wi-Fi (registered trademark), Bluetooth (registered trademark), etc.) for communicating with an external device 13, the internet 12, etc., LTE (registered trademark), wired LAN, etc. In this specification, the indication of the registered trademark is omitted for similar terms. A landscape video to be reproduced exists in the ROM 4 in the video recording/reproducing device 10 or a storage (not shown) in the server 11 on the internet 12. When reproducing video on the internet 12, streaming reproduction may be performed while cache is stored in the ROM 4, and cache reproduction may be performed during continuous reproduction. This eliminates the need for internet communication, for example.

In this embodiment, the computing device in the server 11 on the internet 12 determines recommended landscape and notifies it to the video display device 10. As a result, the recommended landscape may be automatically reproduced. In some embodiments, the server 11 may be provided outside the video recording/reproducing device 10. In some embodiments, part or all of the server function including the inference function may be provided inside the video recording/reproducing device 10.

Figure 2:
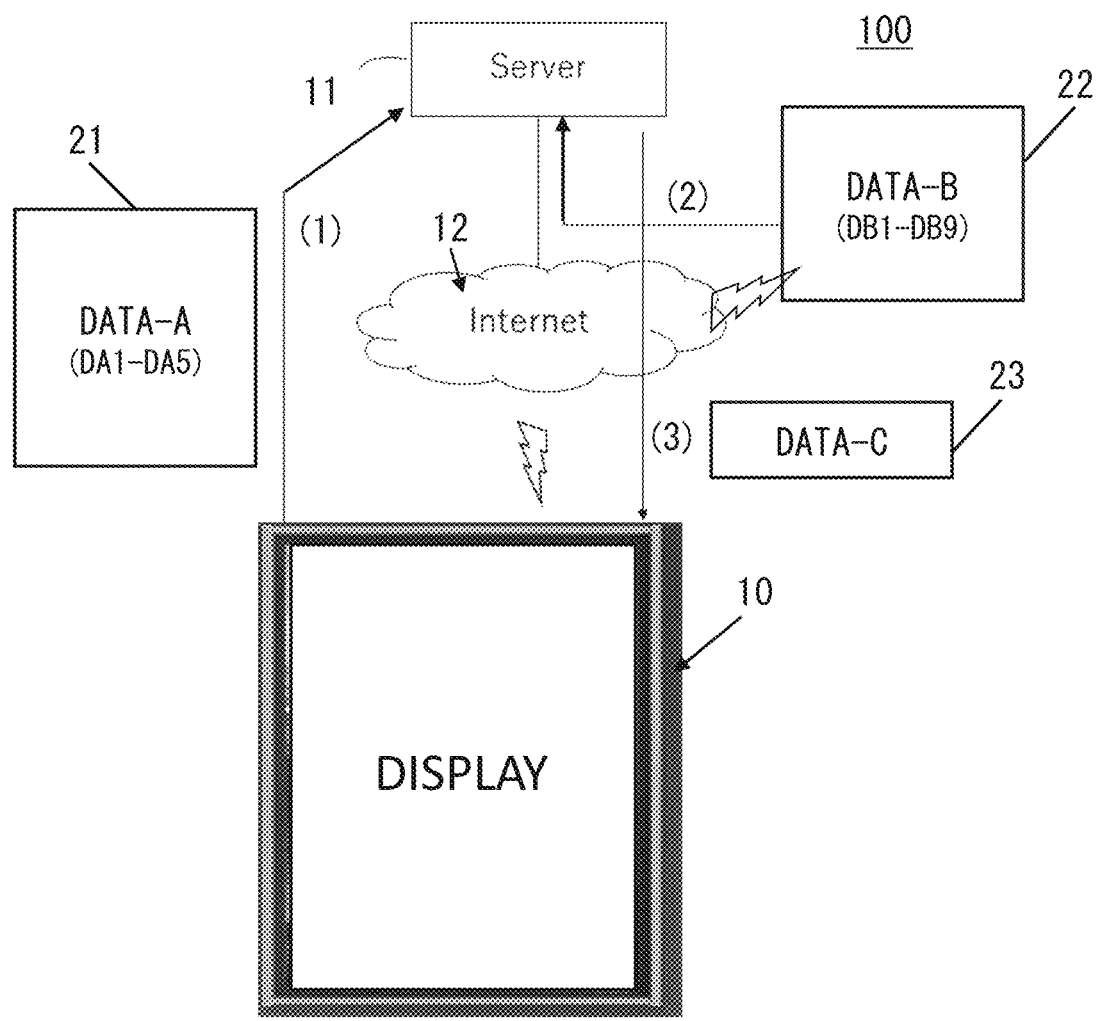
FIG. 2 shows an explanatory diagram showing an operation example of the landscape video recording/reproducing system of FIG. 1.

A method of determining recommended landscape will be described with reference to FIG. 2. In FIG. 2, the hardware configuration is the same as the landscape video recording/reproducing system 100 of FIG. 1. A video display device 10 has the display 1 of the video recording/reproducing device 10 of FIG. 1 and connected components (GPU 2 and others).

In order to determine a recommended landscape, data 21 (DATA-A) necessary for selecting the recommended landscape is sent from the video recording/reproducing device 10 to the server 11 via the internet communication 12 as indicated by an arrow (1). The server 11 accesses the internet 12 as indicated by an arrow (2), collects the necessary data 22 (DATA-B) in addition to the data 21 (DATA-A), and inputs the information data 21 and 22 into Data 23 (DATA-C), which is a recommended landscape candidate, determined by performing processing using a recommended landscape selection algorithm or AI, and is transmitted to the video recording/reproducing device 10 along an arrow (3).

The data 21 (DATA-A) transmitted from the video recording/reproducing device 10 to the server 11 includes the following information DA1 to DA5.

DA1: User Information

The term information DA1 "user information" used in this specification refers to information of a user who is currently viewing the display 1 of the video recording/reproducing device or video recording/reproducing device 10. The video recording/reproducing device 10 may be provided with a user registration function, and the user may be managed by the video recording/reproducing device 10 and the server 11. It is possible to grasp which user is using the video recording/reproducing device 10.

The video recording/reproducing device 10 used by a single user sends logged-in user information to the server 11. The video recording/reproducing device 10 used by a plurality of users may send logged-in user information, analyze the image of the camera video taken by the camera 8 of the video recording/reproducing device 10 to send user information about the user in front of the video recording/reproducing device to the server 11.

DA2: Landscape Browsing History, Operation History

The term information DA2 "landscape browsing history, operation history" used in this specification refers to history information such as which landscape the user has seen in the past and what kind of operations the user has performed in the past. The history information is sent to the server 11. The history information is used as data for inferring the user's tastes and preferences in the server 11 and for outputting recommended landscape candidates. The history information may be sent to the server 11 each time landscape is browsed or operated, or may be sent collectively when recommended landscape is selected.

The history information may be used, for example, to increase the proportion of landscape such as sea or summer that is displayed when inferring a recommended landscape candidate for a user who often sees landscape of the sea. For example, in the case of landscapes with animals, history information is used to reduce the proportion of landscapes that include animals when inferring candidates for recommended landscapes for users who frequently perform operations that change landscapes quickly.

DA3: User State Acquired by Camera, Microphone, or Sensor

The term information DA3 "state of the user obtained by camera, microphone, or sensor" used herein means information inferring the state of the user based on data from the camera 8, microphone 9, and sensor (not shown) of the video recording/reproducing device 10. This may be used to output scenery candidates that match the user's state when inferring recommended scenery candidates. For example, if it can be inferred that the user is looking down at the desk and concentrating, "calm landscape that allows concentration" may be output as a landscape candidate. For example, if it can be inferred that a plurality of users are having dinner or having a party, "lively and bright scenery" may be output as a scenery candidate. For example, if it can be inferred that the user is drinking at a jazz bar or quietly, "night scene" may be output as a landscape candidate. For example, if it can be inferred that there are no people, "quiet landscape" may be output as a landscape candidate, and sleep of the video recording/reproducing device 10 may be instructed as necessary.

DA4: State of the Installation Environment Obtained Using Camera, Microphone, Sensor, or Radio Wave Condition The information DA4 used in this specification, the expression "state of the installation environment acquired by using camera, microphone, sensor, or radio wave conditions"

Information DA4 used in this specification, the expression "the state of the installation environment acquired by using a camera, microphone, sensor, or radio wave condition" means information about an environment in which the video recording/reproducing device 10 is located, which is obtained and estimated by using the camera 8, the microphone 9, other sensors (not shown) of the video recording/reproducing device 10, and radio wave conditions. This information is used to output landscape (or scenery) candidates that match the user's condition when inferring recommended landscape candidates in the server 11.

Information about an environment obtained using radio wave conditions and inferred based on it means result information obtained using a method of measuring the amount of activity by using phenomenon such as, for example, deterioration in environmental radio wave reception sensitivity and disconnection with routers when there are many people who own wireless devices such as smartphones and PCs. The information of "wireless signal status" by SSID (connection name) of the router and the number may be used to estimate an environment in which routers are installed because the number of routers (SSID) is large in the case of an environment such as an office town.

In the case of an environment such as an office town, the feature that the number of routers (SSID) is large may be used to estimate the environment in which the routers are installed. The radio reception sensitivity, router SSID status, etc. may be stored periodically. The stored information may be used to estimate the amount of activity or the environment around the router. That information may be used to estimate the landscape. For example, when it is estimated that there is a lot of human activity, a bustling scene such as a street or an amusement park may be displayed. For example, if it is estimated to be an office district, a quiet forest may be displayed.

For a quiet and calm environment, "quiet and calm scenery" may be output. For a busy environment, "attractive scenery at first sight" may be output. If the office environment is inferred from the camera 8, radio wave conditions, etc., "scenery that facilitates concentration on work" may be output. If the home is inferred from the camera 8, radio wave conditions, etc., a landscape candidate for "relaxing scenery" may be output. If the environment is presumed to have been turned off, a command instructing sleep of the video recording/reproducing device 10 may be output.

A sensor used for estimating the environment of the video recording/reproducing device 10 may include a thermo-hygrometer, a barometer, an altimeter, a geomagnetic sensor, an illuminometer, LIDAR, an odor sensor, an atmospheric sensor, or the like provided inside and/or outside the video recording/reproducing device 10. Radio waves may be used to grasp a positional relationship with a router by Wi-Fi positioning, or to convey environmental information to the video recording/reproducing device 10 by beacons (Bluetooth, etc.), RFID, or the like.

DA5: Location Information of Installation Location

The term information DA5 "location information of installation location" used in this specification means location information of the installation location of the video recording/reproducing device 10 grasped from user settings, GPS sensor, base station information by SIM of Network I/F, and the like. The information may be information obtained by guessing where the video recording/reproducing device 10 is located. The information DA5 is used by the server 11 to output landscape candidates that match the user's condition when inferring recommended landscape candidates. For example, in the server 11, when a position of a local sun is grasped based on the latitude and longitude of the installation location of the video recording/reproducing device 10, a landscape candidate (sunrise landscape at sunrise, daytime may output daytime landscape, dusk landscape at sunset, post-sunset or night landscape, etc.). When a season of the installation location is grasped from the latitude and longitude and the date and time, landscape candidates (summer landscape for summer, etc.) matching the grasped season may be output. When confirming a country or a region of the installation location from the latitude and longitude, a landscape candidate matching the confirmation (using calendar information, if the installation location of the device 10 is Japan, the day when there is an event peculiar to Japan (Doll Festival, etc.) landscape, etc.) may be output.

The data 22 (DATA-B) collected by the server 11 from the internet 12 includes the following information DB1 to DB9.
DB1: Date and Time The term "date and time" in the information DB1 used in this specification means information on date and time when a recommended landscape is requested by operating the video recording/reproducing device 10. This information is combined with the location information of the installation location of the DA5 and other information, so that when the server 11 outputs a landscape candidate suitable for the date, time, season, etc. of the location where the video recording/reproducing device 10 is installed.
DB2: Season The term information DB2 "season" used in this specification means information on seasons for each country or region. As described above in DA5 "location information of installation location" and DB1 "Date and time", this information may be used when the server 11 outputs a landscape candidate that matches the season of the installation location of the video recording and reproducing device 10 by combining with the season of the installation location of the video recording/reproducing device 10. The "season" of the installation location of the video recording/reproducing device 10 is used when outputting estimated information estimated from DA5 "location information of installation location" and DB1 "date and time", that is, landscape candidates related to the "season" of the installation location of the video recording/reproducing device 10 based on the season-related information recorded on the internet including the server. For example, if it is installed in Japan and it is January 1st, it is possible to display on the video recording/reproducing device 10 a landscape related to the New Year.
DB3: Time Information (Sunrise/Set, Age of the Moon, Etc.)

The term "time information (sunrise/sunset, moon age, etc.)" used in this specification means information related to the time of each country or region, such as sunrise and sunset times, moon age, and the like. This information is used when the server 11 outputs a landscape that matches the time of day, such as a sunrise landscape when the recommended landscape candidate request time is sunrise, and a night landscape after sunset as described in DA5 "Location information of installation location".
DB4: Weather The term "weather" in the information DB4 used in this specification means weather information at the place where the video recording/reproducing device 10 is installed. For example, this information is used when the server 11 outputs a candidate scene or the like to add an effect such as looking out through an actual window by outputting rainy landscape image and adding raindrops to the landscape image by CG if a command to display a video of the video recording/reproducing device 10 for the recommended landscape when it is raining is operated.
DB5: Map Information The term "map information" in the information DB5 used in this specification means map information that may be obtained from Google Map "Google LLC's trademark" or the like.

This information, as described in the above DA5 "location information of the installation location", by combining the position information of the video recording/reproducing device 10 and the information DB5, may specify the installation location of the device 10 on the map, and collect national or regional information and geographic or geographic features. Based on the collected information, the server 11 outputs landscape candidates suitable for the country or region where the device 10 is installed. For example, if a particular color or object is culturally unfavorable for that country, landscape candidates that do not include the unfavorable scenery may be output.
DB6: Calendar Information The term DB6 "calendar information" used in this specification means calendar information for each country or region that may be obtained from Google Calendar "Google LLC's trademark" or the like. The server 11 grasps national or regional events (Christmas, Doll Festival, in Japan, etc.), and outputs landscape candidates considering the event when output of recommended landscape is requested.
DB7: SNS The term "SNS" in the information DB7 used in this specification means SNS information such as users. The server 11 analyzes the information DB7 to infer the user's tastes and preferences or global trends, and outputs landscape candidates considering the inferred information.
DB8: News The term "news" in the information DB8 used in this specification means information related to news of the place where the video recording/reproducing device 10 is installed or global news. Based on the information DB8, the server 11 outputs a landscape candidate suitable for the time when the device 10 is in operation. For example, during the Olympics, more landscape candidates related to sports or venues are output.
DB9: Landscape Information The term "landscape information" in the information DB9 used in this specification means information relating to the shooting location or shooting target of each landscape image. The information is used as reference information when the server 11 grasps the details or background of the landscape video and estimates the recommended landscape.

Information that does not change among the above information DA1-DA5 and DB1-DB9 may be stored in the server 11. As a result, for example, it becomes unnecessary to send or collect information (data) again, and it is possible to reduce the processing time or load when selecting (inferring) recommended landscape.

In FIG. 2, the data 23 (DATA-C) indicated by the arrow (3) indicating the flow of data from the server 11 to the video recording/reproducing device 10 is the data of the "recommended landscape candidate" that is output based on a predetermined recommended landscape selection algorithm by the server 11. In addition to the embodiments described with respect to data 21 (DATA-A) and data 22 (DATA-B), the following two methods may also be used according to a given preferred landscape selection algorithm embodiments.

In a first method, the server 11 considers "viewed landscape with a large number of times" and "landscape with many favorites set by the favorite setting function" as popular landscape for all users, and preferentially outputs the popular landscape as a recommended landscape candidate.

In a second method, the server 11 sets the recommendation function to semi-automatically, notifies a user of a keyword of a landscape to be recommended to the user via the video recording/reproducing device 10, makes a recommendation based on the notified keyword, outputs preferentially as a landscape candidate. For example, if the user wants to see the landscape of a specific season, the keyword is "spring" or "summer". If there is, it may be "cat", "tower", or the like. Multiple keywords may be specified. Those relationships may be specified with "and" or "or". The unit for specifying the keyword is "select from candidates on video recording/reproducing device", "input character string to video recording/reproducing device", "voice input with microphone", "QR code with keyword set on camera". In addition, it may be "read similar scenery with a camera" and "set the URL of a similar scenery on the video recording/reproducing device (manual input, voice input with a microphone, QR code with a camera, etc.)", and a landscape similar to the set similar landscape may be output as a recommended landscape candidate.

Multiple algorithms described in this disclosure, including the first and second methods, may be combined and combined in a prioritized manner.

In addition to programming as a fixed algorithm, AI technology may be used as a implementation form of the recommended landscape selection algorithm in the server 11 that outputs the recommended landscape candidates of the data 23 (DATA-C). In particular, deep learning using data 21 and data 22 as input data and data 23 as output is given as an example. By grasping a behavior of the user when a recommended landscape is displayed on the device 10 (played for a long time, set as a favorite, changed to another landscape immediately, etc.), it may be estimated whether or not the displayed landscape is preferred by the user. Therefore, continuous learning of the estimation results as correct data may improve the model and improve the quality of the recommended landscape function.

The recommended landscape recommendation function may be performed on a user interface (UI) at the following timing.

Timing 1: User's Voluntary Switching of Landscape

Timing at which a user issues a landscape switching instruction using an interface such as an operation button (wired or wireless, not shown) provided in the video recording/reproducing device 10, a remote controller (one of the external devices 13) of the video recording/reproducing device 10, a gesture input using the camera 8, voice input using the microphone 9, and the like.

Timing 2: Automatic Landscape Switching Over Time

Timing of landscape switching periodically and/or at specified times. Designation accompanied by power OFF and power ON may be performed. For example, when the power is turned on at 8:00 in the morning, the landscape is switched, and when the power is turned off at 8:00 in the evening, the landscape is automatically switched without any user operation. The user may set in the video recording/reproducing device 10 or the server 11 functions to be performed in conjunction with switching, such as switching intervals or times, power OFF/power ON, and the like. The setting means is the same as that of the Timing 1 above "user's voluntary switching of landscape".

Next, screen display processed and displayed on the display 1 of the video recording/reproducing device 10 will be described with reference to FIG. 3.

"Landscape selection" and "landscape reproduction", which are recommended landscapes, are independent and different processes. The process using the data files 21 and 22 is "selection of landscape" and is not displayed on the screen during the selection process. When the selection process is completed and the next landscape is determined in the server 11, the process shifts to "reproduction of landscape" for the next landscape, and the landscape is reproduced on the screen in order as shown in display steps a1 to a4 in FIG. 3A. As described above, the landscape video to be reproduced is stored in the ROM 4 within the video recording/reproducing device 10 and/or the storage within the server 11 on the internet 12. When reproducing video on the internet 12, streaming reproduction is performed while cache is stored in the ROM 4. Cache reproducing is performed during continuous reproducing. Therefore, internet communication is not required for the "reproduction of landscape" process.

The landscape determined by the "selection of landscape" is reproduced in the form of a unique code following the "reproduction of landscape" process. A numerical code, character code, URI, and the like are used as a code that uniquely represent, for example and without limitation. With the code, the landscape data stored in the server 11 or the landscape data on the cache may be identified and reproduced.

Figure 3A:
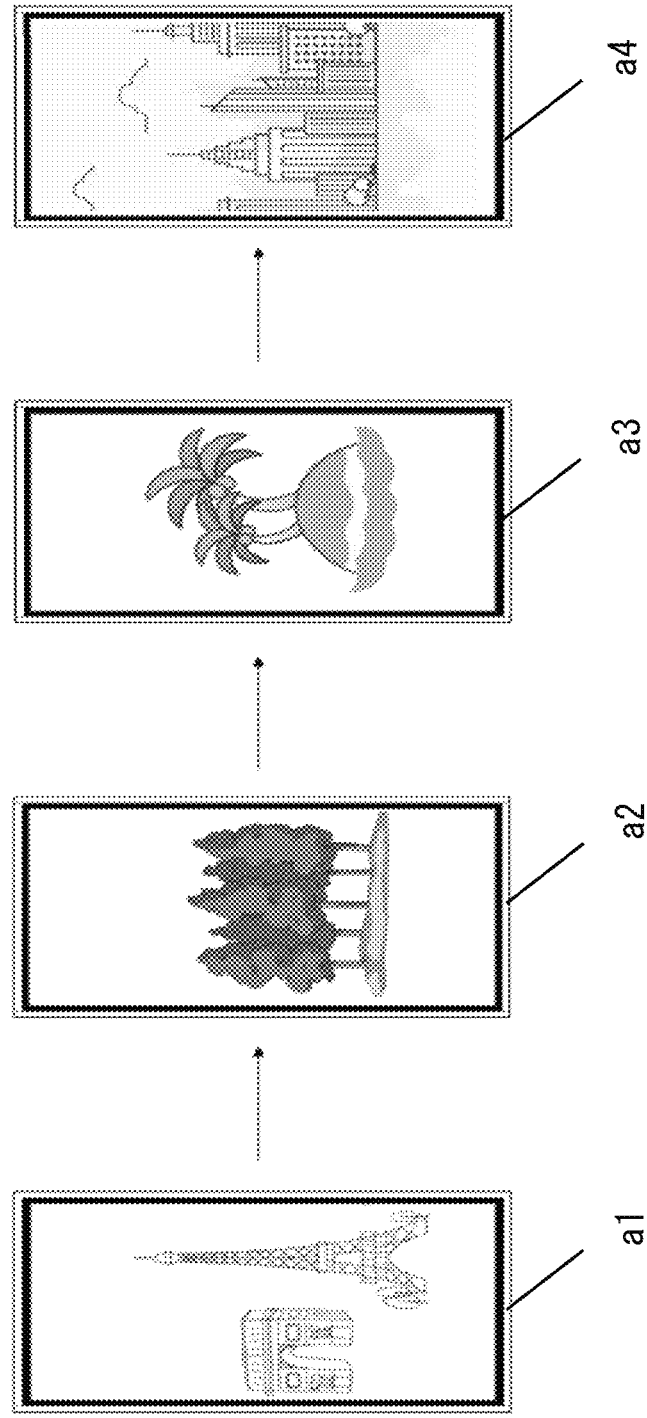
FIG. 3A shows a landscape video image sequentially displayed on the landscape video recording/reproducing device as an example of the present embodiment.

Specifically, when it becomes necessary to switch to the next landscape in the display step a1 of FIG. 3A, the video recording/reproducing device 10 performs the "landscape selection" process without changing the screen. When the next landscape to be reproduced is determined, the video recording/reproducing device 10 uses the code representing the determined landscape to perform the "reproduction of landscape" process. When this process is completed, the process moves to the display step a2. By repeating this processing flow with the steps a2, a3, and a4, the display of display steps a1 to a4 is performed.

A display step b1 of FIG. 3B shows a list of candidate landscapes displayed after the "landscape selection" process. The list of candidate landscapes is created from the candidates for "selection of landscape" and their thumbnails (reduced images). In some aspects, a user may select and display a particular landscape from the list of candidate landscapes. In some aspects, the user may sequentially display and reproduce landscapes by regarding the list as a landscape play list from the display steps b2 to b5. If there is landscape that the user does not like, a command of the landscape that the user does not like is sent to the server 11 via the video recording/reproducing device 10, the landscape that the user does not like is excluded, and a recommended landscape candidate is output to the server 11 again.

Figure 3C:
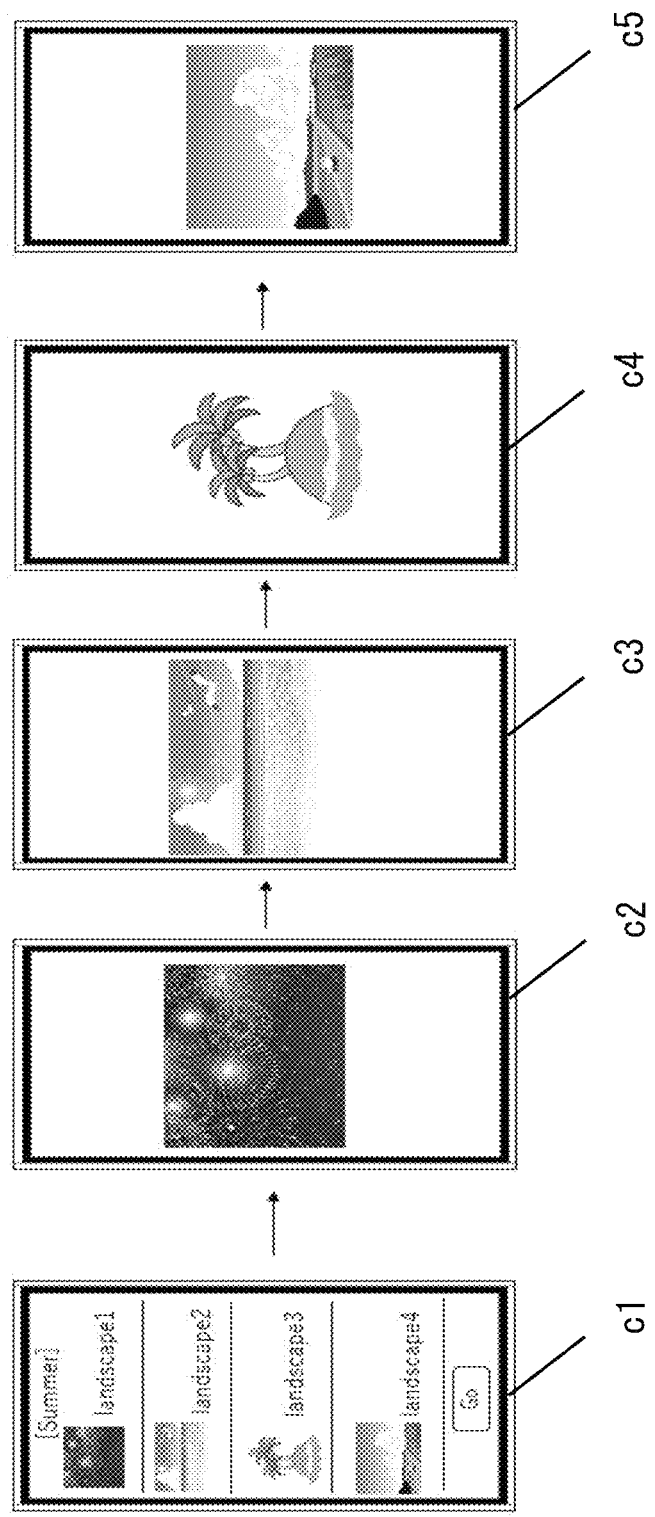
FIG. 3C shows a landscape video image sequentially displayed on the landscape video recording/reproducing device as another example of the present embodiment.

In the case of the second method "recommendation is semi-automatic and notifies the user of the keyword of the landscape that the user wants to recommend", the recommended landscape based on the notified keyword is presented as shown in FIG. 3C.

In FIG. 3C, supplementary information is added to "display candidate landscapes in a list" of FIG. 3B. For example, in the display step c1, the title "Summer" is given. As a result, the user may easily understand, for example, on what basis the candidate landscape was selected.

The supplementary information is the information of the data 21 or data 22 in FIG. 2, and when the server 11 returns the data 23 of the landscape candidates, what is the information of the data 21 or data 22 used to select candidates as metadata (additional data of data) is included in data 23. The video recording/reproducing apparatus 10 may use this metadata to display an image based on supplementary information, as shown in the display step c1 of FIG. 3C.

Thus, FIG. 3C shows an example in which the keyword "summer" is specified. A list of recommended landscape for summer is displayed in a display step c1. A user may select a landscape to be reproduced from the landscape list, or may sequentially reproduce the landscape list of the display step as a reproduction list as shown in display steps c2 to c5.

Figure 4:
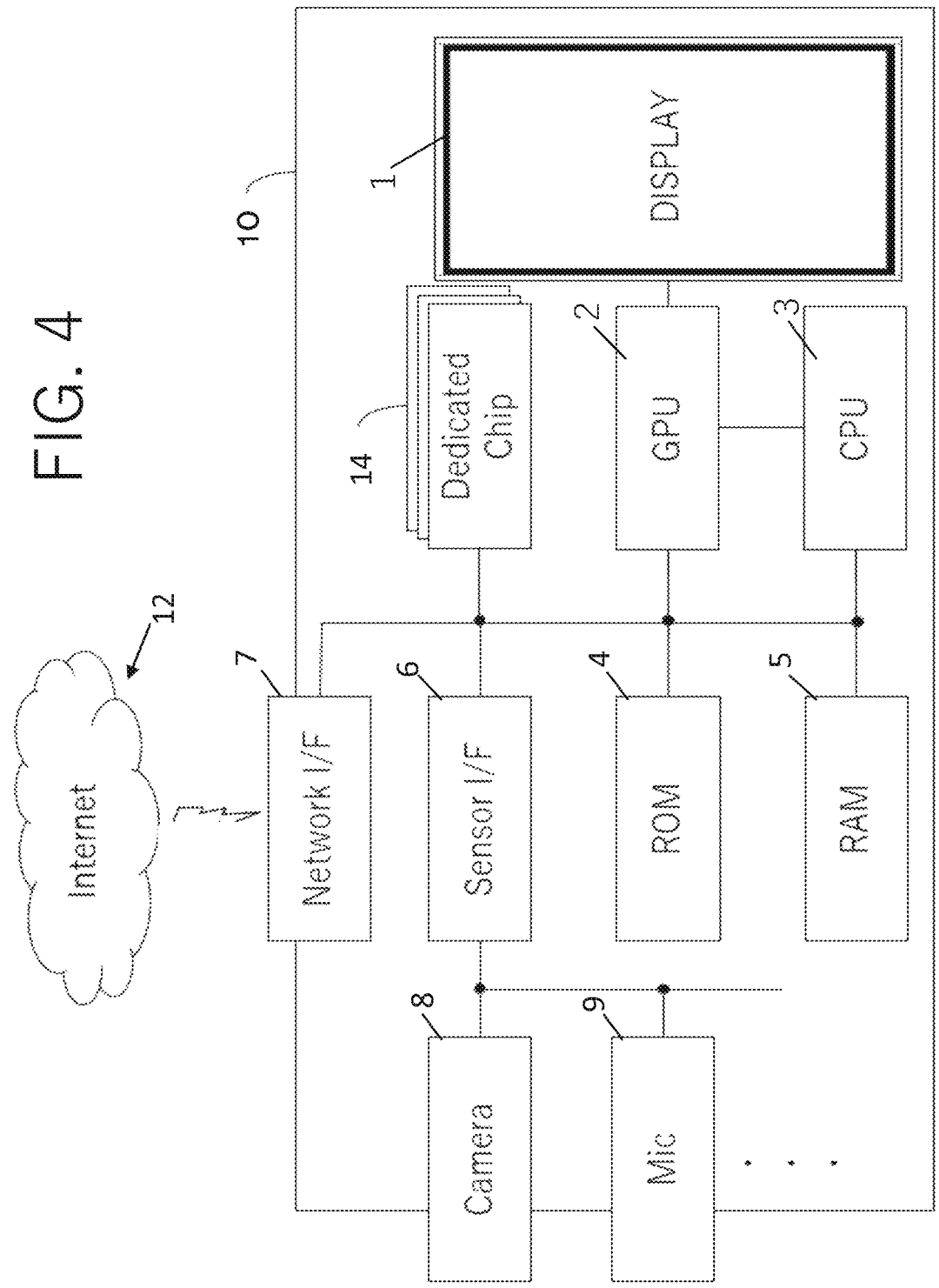
FIG. 4 shows a simple block configuration diagram of a video recording/reproducing device as one embodiment of the present disclosure.

FIG. 4 shows a simplified block configuration diagram of a video reproducing device (or an image display device) 10 as another embodiment of the present disclosure. This has the same configuration as the video recording/reproducing device 10 of the landscape video recording/reproducing system 100 of FIG. 1, and the same components are given the same reference numerals.

The video reproducing (or playback) device 10 includes a display 1, a GPU for displaying video on the display 1, a CPU, a ROM, a RAM, and a sensor interface (Sensor I/F: configured with USB, SPI, I2C, UART, CAN, etc.) 6 for attaching various sensors, an external device (equivalent to the external device 13 in FIG. 1) or a network interface (Network I/F: configured with Wi-Fi, Bluetooth, LTE, wired LAN, etc.) 7 for communicating with an internet 12. The display 1 may be wall mounted and used as a virtual window. Landscape videos to be reproduced exist in a memory (ROM) 4 in the video reproducing device 10 and/or the storage on the internet 12 (corresponding to the server 11 in FIG. 1). In order to reproduce the video on the internet 12, streaming reproduction is performed while cache is stored in the memory 4. As a result, a cache reproducing is performed during a continuous reproducing, eliminating the need for internet communication.

A dedicated chip (Dedicated Chip) 14 for realizing this embodiment is incorporated in the video reproducing device 10. The dedicated chip 14 incorporates the following necessary chips for desired functions to be executed.

Video decoder chip: A chip dedicated to decoding video to reduce a load of real-time video processing. This chip makes it possible to reduce the decoding processing load on a CPU 3 or a GPU 2. A H.265 decoder chip or the like is suitable. Image processing chip: A chip dedicated to image processing for video frames in order to reduce the load of real-time video processing. This chip makes it possible to reduce the image processing load on the CPU or GPU. A hardware accelerator dedicated to image processing, a programmable accelerator, a DSP, a CPU dedicated to image processing, or the like is used according to necessity.

AI chip: A dedicated chip for AI processing in video processing to reduce the load of real-time video processing. The AI chip is mainly used for inference processing. If learning is also performed within the device 10, a learning chip is incorporated.

Figure 5:
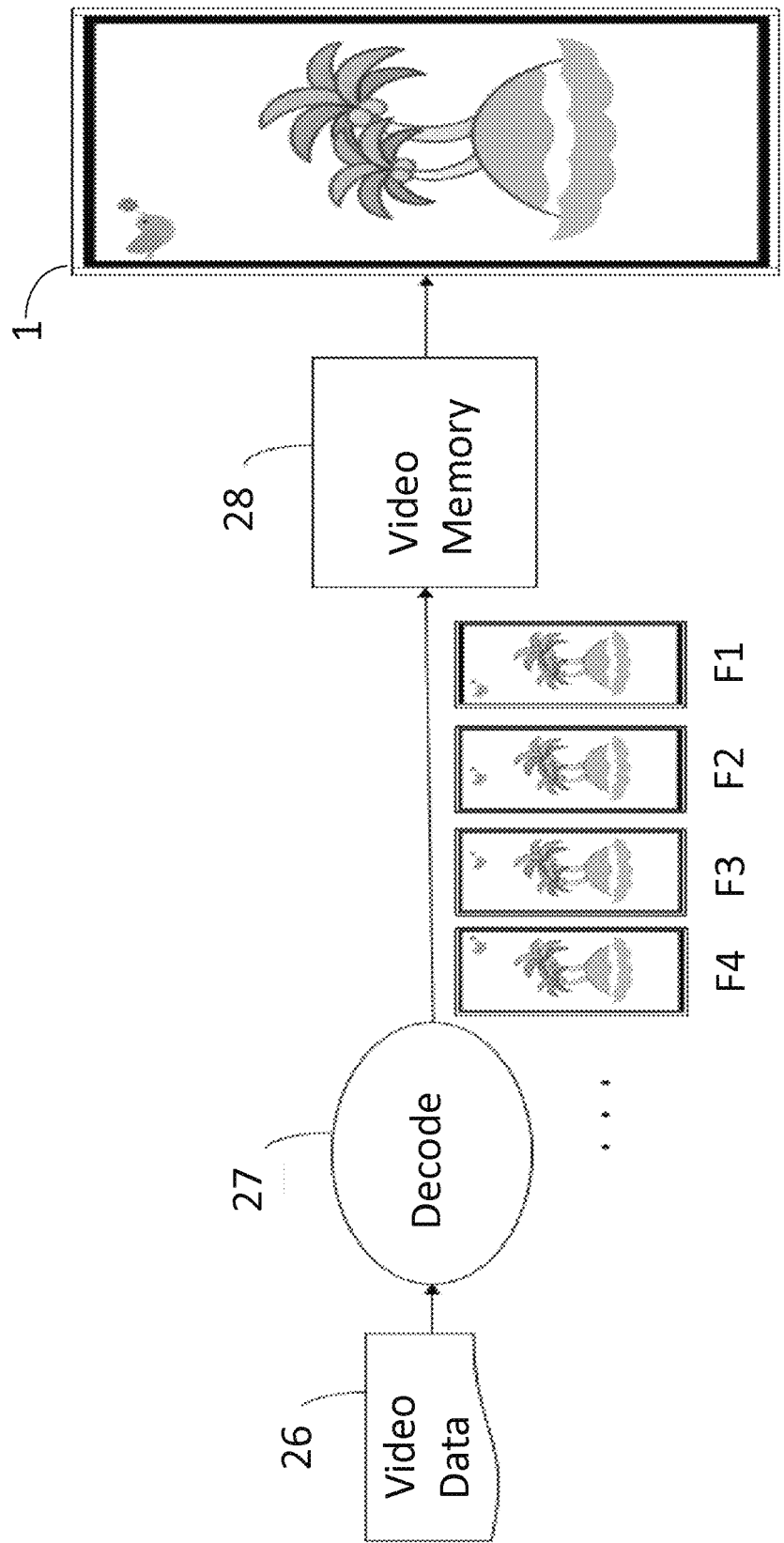
FIG. 5 shows a flowchart of video processing of the video recording/reproducing device of FIG. 4.

FIG. 5 shows a schematic diagram of a normal processing flow in the video reproducing device 10. Video data 26 obtained from the memory (ROM) 4 or the internet 12 is subjected to a decoding process 22 corresponding to a format of the video data 26, and image or sound of each frame F1, F2, F3, F4, . . . is taken out. A decoding process 27 is performed by the CPU 3 or a dedicated chip (H.265 decoding chip, etc.) 14. A frame image is stored in a video memory 28 and displayed on the display 1. The graphics processing unit (GPU) 2 basically performs processing for displaying an image in the video memory 28 on the display 1kann. This frame display is repeated according to the frame rate of the video (24 fps, 29.97 fps, 60 fps, etc.) (for example, if it is 24 fps, 24 frame images are displayed in one second), video and audio are reproduced by reproducing the audio in accordance with the repeated display.

The video memory 28 generally uses the RAM 5 or built-in memory of the GPU 2. Also, if preferred, a video memory built into the dedicated chip 14 may be used.

Figure 6:
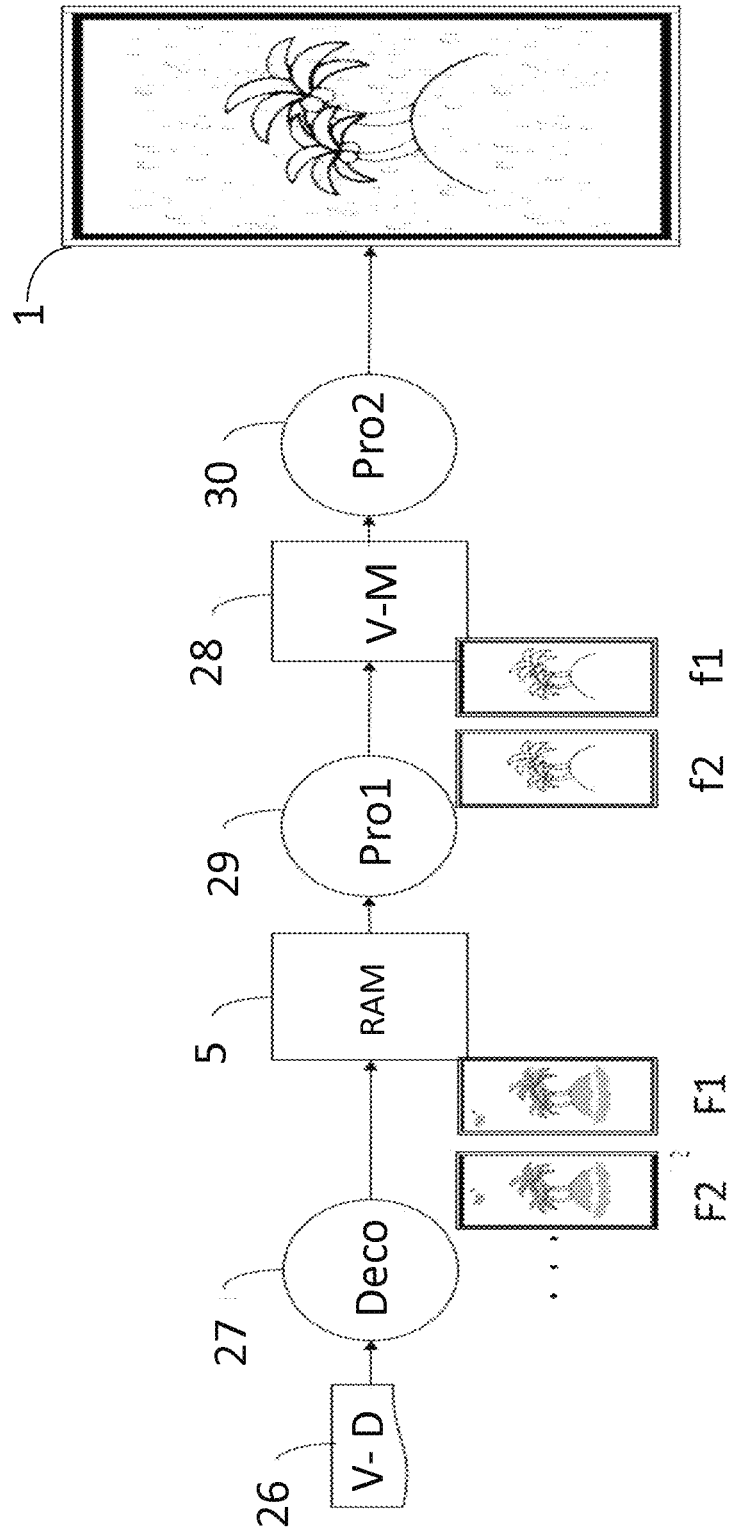
FIG. 6 shows a modified video processing flow diagram of the video recording/reproducing device of FIG. 4.

FIG. 6 shows a modified process flow diagram in which two image processes 29 and 30 are added to the normal process flow in the video reproducing device 10 of FIG. 5. The frame image resulting from the decoding 27 is not directly sent to the video memory 28 as shown in the flow of FIG. 5. The frame image is first stored in the RAM 5, and the first image process (Pro1) 29 is performed. This image processing is performed by the CPU 3, or by a dedicated chip (image processing chip, AI chip) 14 if the CPU load is necessary to be reduced. The processed image is sent to the video memory 28 and subjected to a second image process (Pro2) 30 in the GPU 2 just before displaying the processed image on the display 1.

In FIG. 6, as an example, in the first image process 29, a frame binarization is performed and fast-moving objects are deleted, for example, birds in frames F1, F2, . . . are deleted, in the second image process 30, the display 1 is rendered as if the landscape in the rain is seen through the window (display of raindrops moving on the window). If desired, the sound of the video is also processed or corrected in conjunction with the image processing.

For the first image process 29 described above, image processing of the image for each frame F1, F2 . . . is performed by using the image using the CPU 3 or the dedicated chip 14. However, not only general image processing such as filtering, but also past frame images may be stored by using a large-capacity RAM 5. Therefore, image processing (moving object detection, moving object removal, smoothing using a plurality of frames, etc.) using the transition of frame images may also be performed.

Information on other parts in the device 10 may also be utilized by using the RAM 5. Therefore, for example, it is possible to perform image processing using brightness or color around the device installation portion using information from a camera center, and image processing using information on the internet.

Other chips are also available for image processing. Therefore, for example, an AI chip is used to perform image processing such as object recognition, face recognition, character recognition, etc., and perform image processing suitable for the target. For example, a person may be detected and blurred so that the person may not be identified. For example, characters may be recognized and translated automatically.

For the second image processing 30 described above, the frame images f1, f2 . . . , image processing is performed immediately before being displayed on the display 1. Basically, however, it mainly performs filtering processing using information of a single frame image immediately before display. Since processing uses a pipeline of GPU 2, various processing may be achieved programmatically using shaders. In addition to image processing for the frame image, it is also possible to add another object to the frame image as shown in FIG. 6 (raindrops are added in FIG. 6).

In the image processing of the first image process 29 and the second image process 30, arbitrary image processing is possible. Specifically, image correction, image conversion, image processing of frame images; synthesis of another image to frame images, two-dimensional computer graphics (2DCG), rendered three-dimensional computer graphics (3DCG); visual effects on frame images (VFX) may be added. Preprocessing such as image feature extraction and image recognition for realizing these may also be performed. In some aspects, both the first image process 29 and the second image process 30 may perform all image processing. However, in some aspects, a higher frame rate may be maintained by combining two image processes and performing image processes in parallel. In some aspects, processing efficiency may be improved by allocating suitable processes to the respective processors that perform the image processing of the first image process 29 and the second image process 30. For example, image correction that performs the same processing on all pixels on a frame may be processed at a higher speed by allocating GPU 2 as a processor rather than allocating CPU 3. For example, in the case of AI processing, when an AI chip is mounted on the dedicated chip 14, high-speed processing becomes possible by allocating the AI chip as a processor.

The image processing of this embodiment is characterized in that it is not mere image processing but is targeted for landscape images. In order to "reproduce the landscape as a beautiful landscape seen from the window or as a user's favorite landscape", real-time image processing is performed on the landscape video using the implementation means such as the above-described embodiment. More specific contents of the image processing are as follows:

<General Color Tone Correction for Video>

Depending on the camera or shooting environment, there are cases where the color tone of the entire landscape image is not desirable. For example, when the balance of the tone curve is bad and leans to one side, when the white balance is not appropriate. In this image processing, by automatically performing level correction, contrast correction, or color correction, it is possible to correct the entire video to a more desirable color tone.

Figure 7A:
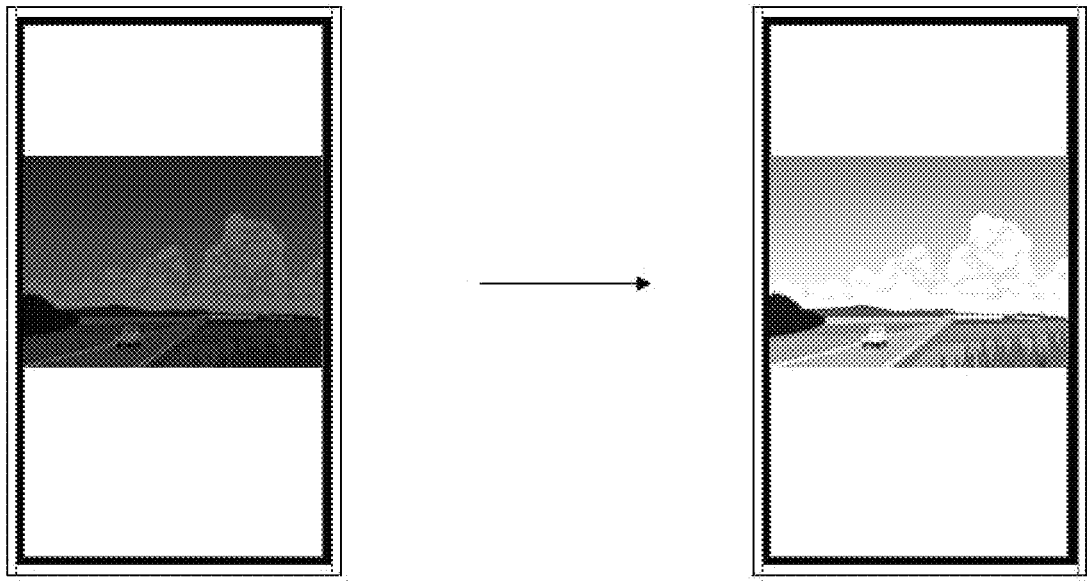
FIG. 7A shows an example of color tone correction of a landscape image displayed on a display of the image recording/reproducing device of FIG. 4.

FIG. 7A shows an example of color tone correction for a general landscape image on the display 1. An original landscape image is dark overall, and the tone curve is close to the 0 side. By automatically correcting this so that the tone curve is balanced, it is possible to convert to a more desirable color tone.

Since users have preferences regarding color tone, the video reproducing device 10 is configured to change the presence/absence, strength, or characteristics of this automatic correction according to user settings. Changes may be made step by step, depending on the user's knowledge of image quality, as follows.

(1) Set finely individually about brightness, contrast, etc.
(2) Set with a rough tone level ("soft", "vivid", etc.)
(3) Select a landscape with favorite color tone In some aspects, the device 10 may be constructed to guess a user's favorite color tone from a landscape that the user has viewed in the past, and display or notify the user of the guessed favorite color tone at the time of setting. As a result, for example, it is possible to contribute to the user's reference for selecting a favorite color tone.

<Color Tone Correction According to the Contents of the Landscape>

(1) In color tone correction according to the contents of the landscape, color tone correction suitable for the landscape is performed based on the shooting target of the landscape, the shooting time, and the like. For example, the following color tone correction is performed.
(2) If a landscape mainly reflects mountains and forests, it is corrected so that the green appears more strongly.
(3) If it is a seascape, correct it so that the blue of the sea and/or the white of the clouds appear more strongly.
(4) For a sunset scene, correct the red sunset as seen by the naked eye without strongly correcting the color level.
(5) If it is a landscape that mainly reflects autumn leaves, it is corrected so that red or yellow appears more strongly.

Figure 7B:
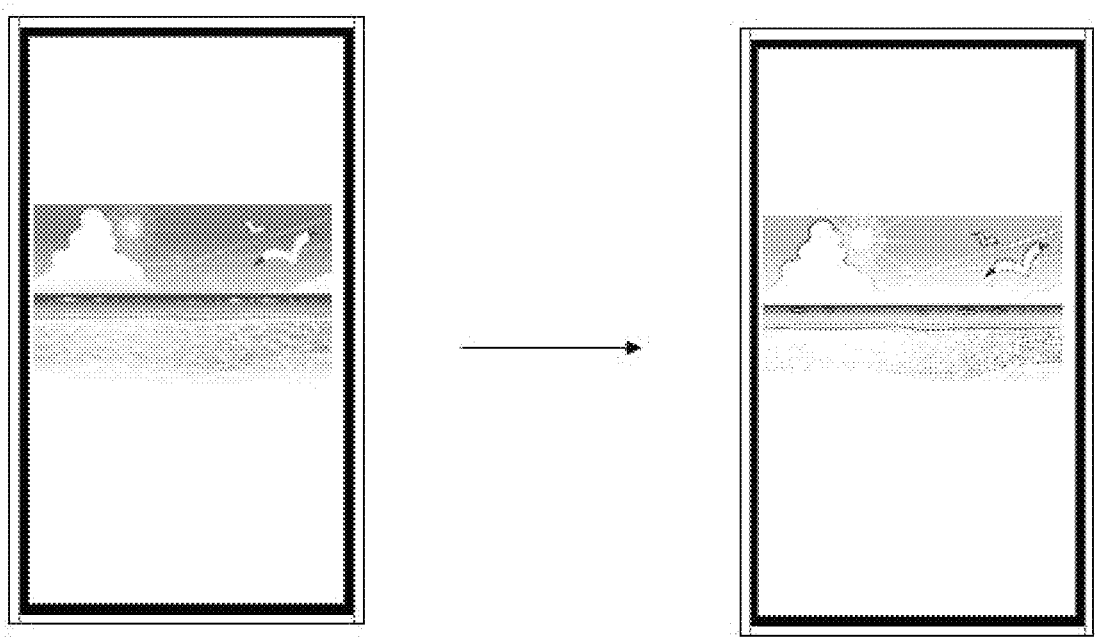
FIG. 7B shows an example of color tone correction of a landscape image corresponding to the content of the landscape displayed on the display.

An example of this embodiment is shown in FIG. 7B. An original landscape image is recognized as a seascape, and a color tone is automatically corrected so that the blue of the sea and the white of the clouds become clearer (monochrome in the drawing). In some aspects, the entire frame image may be corrected all at once. Alternatively, in some embodiments, a mask may be applied to correct only a portion of the image (e.g. correct only a cloud portion in FIG. 7B).

In order to recognize contents of a landscape, metadata of a landscape video (stored information such as a shooting location, shooting time, and supplementary information about the landscape) and/or contents of a landscape grasped by image recognition (estimation from contents of similar landscapes that appear in image searches, inference by a landscape recognition model (deep learning model) that learns to read the landscape image and find out the shooting location, shooting time, etc.) may be used.

<Image Processing According to the Weather or the Environment of a Device Installation Location>

When displaying a landscape image such as "a beautiful landscape seen from a window", the image may be corrected according to the weather at the installation location of the image reproduction device 10. This may, for example, make the device feel more like a window and create the illusion that the landscape location is really nearby.

Figure 8A:
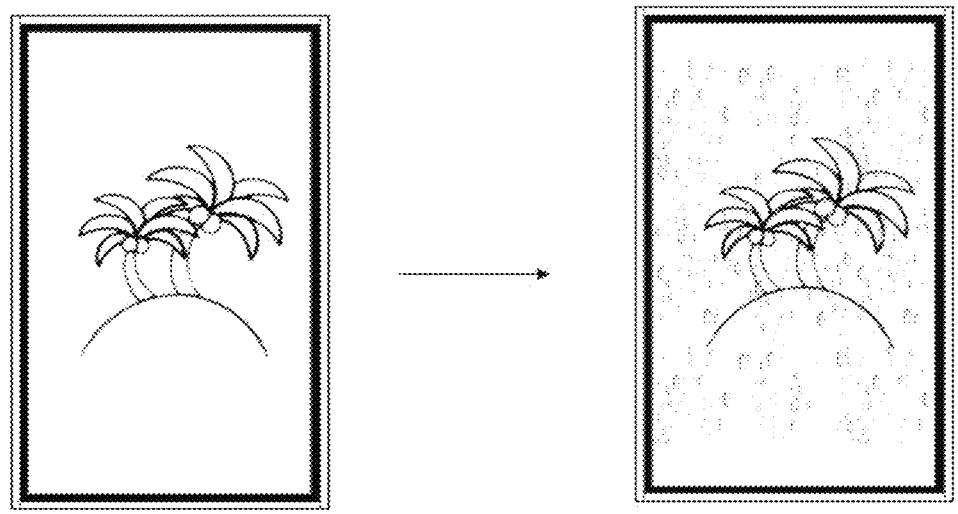
FIG. 8A shows an example of image correction according to the installation environment of the video recording/reproducing device of FIG. 4.

For example, if the weather is rainy and the device 10 is reproducing a sunny scene, it is difficult to perceive the device 10 as a window. However, by adding an effect as if raindrops are attached to the window as shown in FIG. 8A, the device 10 may be felt as a window.

Similarly, it is possible to enhance the feeling of a window by adding a correction or effect suitable for the weather, such as fine weather or cloudy weather. Image processing or corrections based on environmental information other than weather, such as "reduce the contrast if the surroundings of the device are dark" or "lower the level of red if the country where the device is located does not like strong red". In order to grasp the weather, information collected from the internet 12, information obtained from sensors that are preferentially or wirelessly connected to the device 10, and the like may be used. As with the above-described "general color tone correction for video", since there are user preferences, the user may set to change the presence or absence or intensity of image processing according to the weather or environment.

<Image Processing that Makes it Look Like a Landscape Seen Through a Special Window>

The same landscape may look different when viewed through a frosted or stained glass window. It may be perceived that the glass of the window acts as a filter and the landscape looks different. Images obtained by applying filter processing, which is image processing such as gray scaling, binarization, sepia, cartoon tone, painting style, sumi-e style, etc., to the landscape may be regarded as changing the appearance through the window. These changes greatly change the impression of the landscape, and may enjoy different impressions. Image processing may be performed on the landscape video as if the landscape was viewed through a special window, depending on the user, predetermined equipment, or other settings.

Figure 8B:
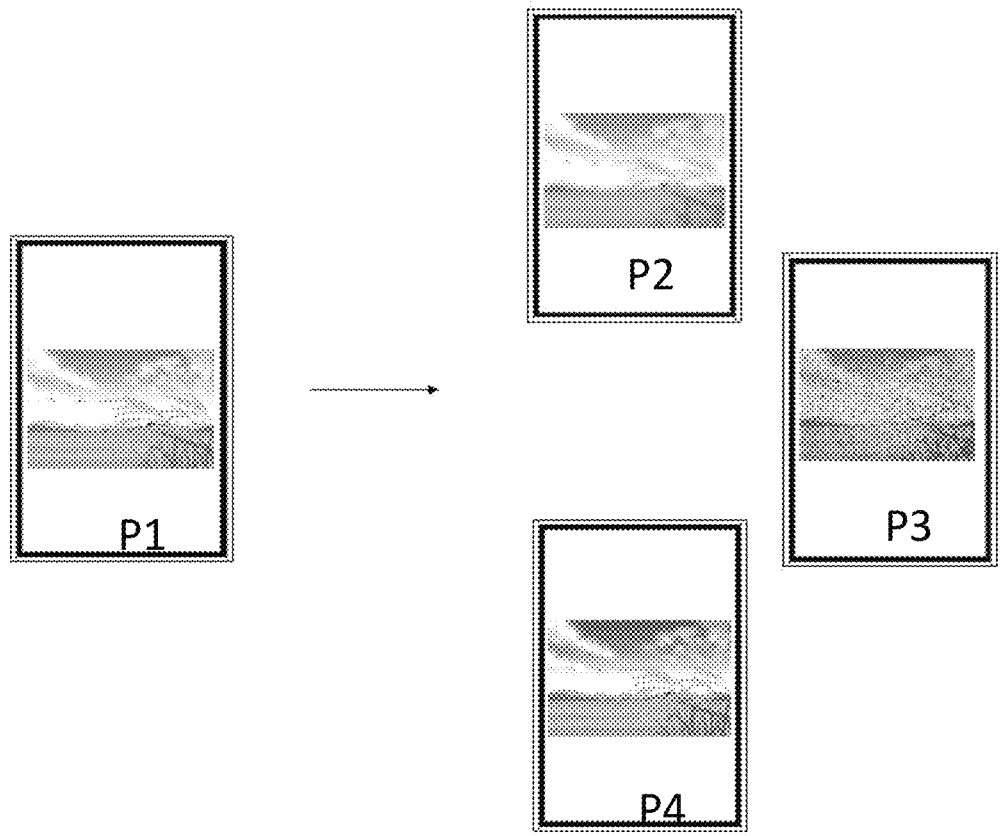
FIG. 8B shows an example of performing predetermined filter processing on a landscape image of the video recording/reproducing device of FIG. 4.

FIG. 8B shows an example in which a landscape image is subjected to predetermined filter processing. For an original landscape image P1, an image P2 of "Landscape seen through a frosted glass window", an image P3 of "Landscape seen through a stained glass window", and an image P4 of "Landscape seen through the sepia window" are displayed. By operating the video reproducing device 10, the user may designate a special window or its characteristics (degree of fogging of frosted glass, mesh size of stained glass, etc.) according to preference.

According to this embodiment, the video reproducing device may have a virtual window type display that displays the video as if a landscape is reflected in the window. There is provided a steep of compositing predetermined and preferred glass window images for displaying images such as "Landscape seen through a frosted glass window", "Landscape seen through a stained glass window", "Landscape seen through a sepia window", etc. with the landscape image.

Figure 9A:
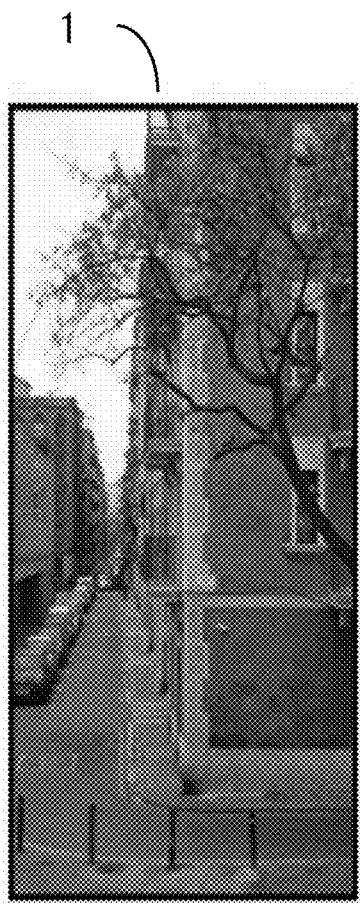
FIG. 9A shows an original image.
Figure 9B:
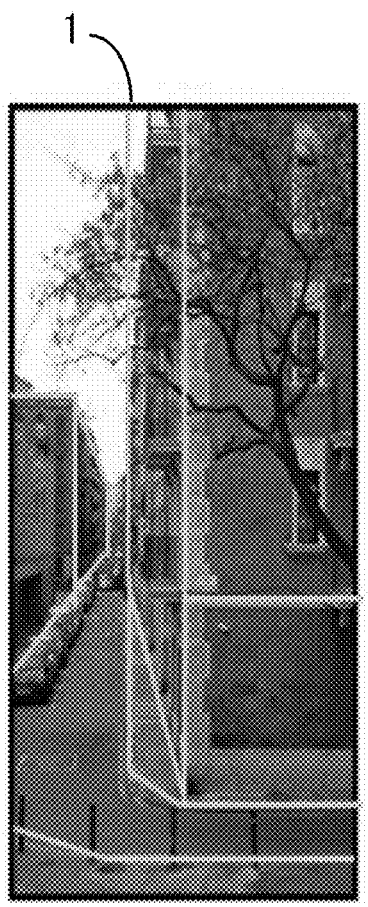
FIG. 9B shows an image to which spatial information is added.
Figure 9C:
FIG. 9C shows an image added with new information.

As another embodiment of the present disclosure, FIGS. 9A to 9C show an example of adding spatial information to video. FIG. 9A shows an original video displayed on a display 1 of a video reproducing device, FIG. 9B shows a video with spatial information added, and FIG. 9C shows a video with new information added. The video reproducing device of this embodiment includes the display 1 for displaying a desired landscape, a unit of setting spatial information of a landscape, a unit of receiving a notification from the outside, a unit of receiving a notification from the outside in the video space, a unit of mapping the external notification to an object that is able to be inserted into the visual space, and a unit of dynamically inserting the object into the video. The video reproducing devices 10 used in FIGS. 1-8 may be utilized in this embodiment. In FIG. 9B, spatial information, which is a three-dimensional model relating to perspective, is set in advance for a landscape image.

Figure 10A:
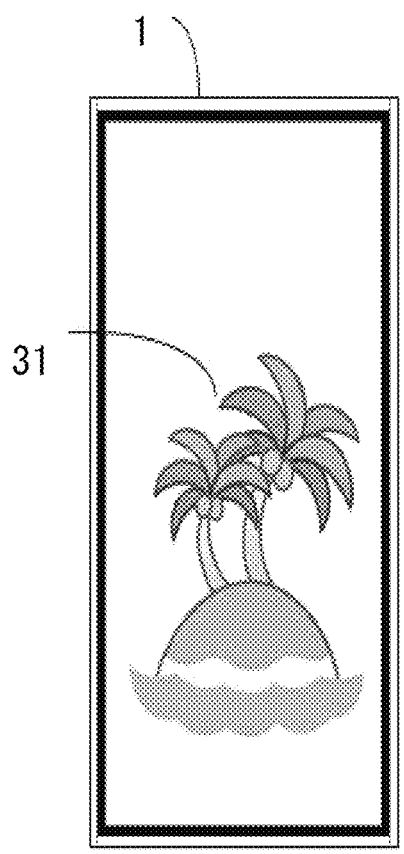
FIG. 10A shows an original image and FIG. 10B shows an image when an email is received.
Figure 10B:
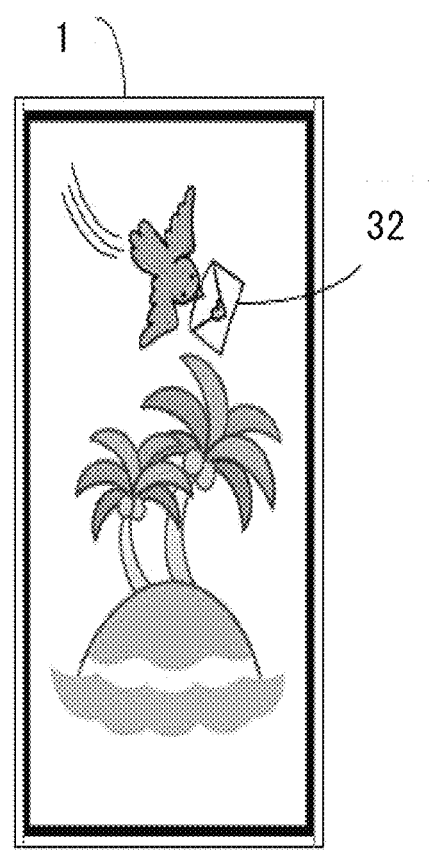

FIGS. 10A and 10B show an example in which, some event outside the video reproducing device, for example, when an e-mail is received or a notification on SNS occurs, the event is converted into an object that may be inserted into a video model and dynamically inserted into the video model.

The event-to-object conversion is performed using, for example, the following rules, but may be individually set by the user.
(a) Manual binding (converting a taxi notification to a taxi object).
(b) Automatically convert a service notification with blue as the service color into a blue animal or the like.
(c) Arrange a persistent object for a notification that should remain (such as a taxi arrival), and arrange a disappearing object (such as an animal) for a notification that may disappear (such as an SNS notification).

FIG. 9C shows an example in which a reserved taxi has arrived and is waiting according to the above rule (a). When an object that is not normally present in the landscape is generated in the landscape after a user is informed of a plurality of rules in advance, the user may recognize this as a notification. In FIG. 10A, a landscape 31 is displayed on the display 1. Spatial information is added to the video in the same manner as in FIG. 9B. When there is an incoming mail from the outside of the video reproducing device, the incoming notification is mapped to an object that may be inserted into the video space of the spatial information as shown in FIG. 10B. A moving image in which a bird object 32 with a letter in its mouth flies is synthesized (superimposed) on a landscape 31. Thus, the incoming mail is notified naturally without disturbing the landscape 31. The notification may include a predetermined ringtone as well as superimpose of an object. The incoming mail may be an incoming call to a video reproducing device or an incoming call to a mobile device such as a smart phone. The object may be configured to indicate that it is a mobile device reception. The object 32 may be a moving image of a flapping bird or a still image. At least one of fade-in, slide-in, and slow-in may be selectively set for dynamic insertion of the object 32. In the examples of FIGS. 10A and 10B, the addition of spatial information to the landscape information 31 is not limited to three dimensions, and includes two-dimensional planes.

According to this embodiment, by synthesizing and displaying a dynamic or static object indicating a notification with a landscape image, it is possible to notify the user viewing the landscape image without impairing their comfort. The present embodiment is not limited to the method of displaying landscape images, and may also be applied to the method of displaying images outside of landscapes.

Figure 12A:
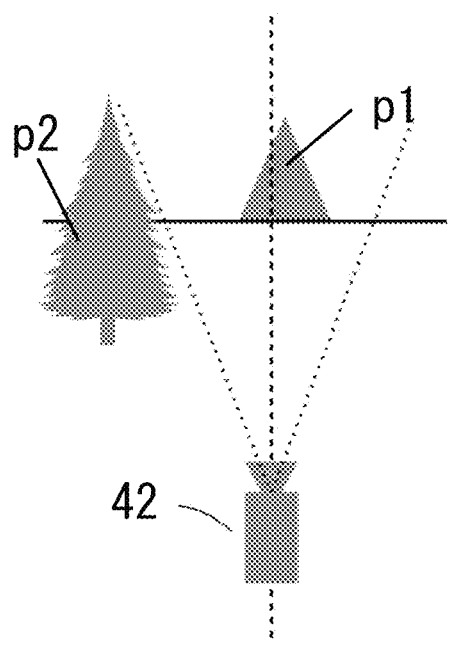
FIGS. 12A and 12B show computer graphic diagrams showing the camera arrangement of FIGS. 11A and 11B.
Figure 12B:
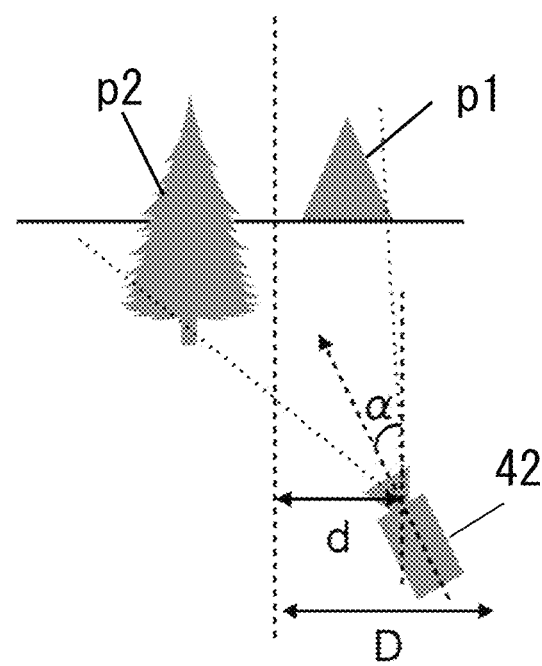

As another embodiment of the present disclosure, FIG. 11A shows an example in which a landscape is displayed on a display 1 when a person M is standing in front of an image display device (or video recording/reproducing device) 40. FIG. 11B shows an example in which the landscape is displayed on the display 1 when the person M is standing diagonally in front of the image display device 40. FIG. 11C shows a camera view image of the person M reflected on the camera sensor device 41 provided in the image display device 40 in the state of FIG. 11A, and FIG. 11D shows an image reflected on the camera sensor device 41 in the state of FIG. 11B. FIGS. 12A and 12B show CG (computer graphics) images created by an image processing unit incorporated in the image display device 40 corresponding to the landscape views of FIGS. 11A and 11B, respectively.

The image display device 40 is constructed to include the display 1, the camera sensor device 41 for recognizing the position of the viewer M in front of the display 1, and a computer graphics generation unit of generating an image of the display 1 to display a real-time rendering (image output calculated by a program in real-time) or real-time video of a live camera on the display 1. The device used in the above examples may be used. It is possible to display an image in which the display image on the display is moved in conjunction with the movement of a viewer M's predetermined part.

FIG. 11A, the camera sensor device 41 may be used for face tracking to extract the eyes or contours of the person M in front. The camera sensor device 41 may comprise a depth sensor. In this embodiment, when the person M moves to the right as shown in FIG. 11B, the image shown on the display 1 changes like the landscape seen from the window in the real world. For example, an object (image P2) that may not be seen from the front becomes visible to the person M. Since the viewing angle of the person M changes, the view (perspective) in the video also changes.

By the movement of the person M described above, the image on the display 1 may be displayed live through the window of the window-shaped display 1. For that purpose, in FIGS. 12A and 12B, it is necessary to calculate the change distance "d" from the front position in FIG. 12A to the tilt position in FIG. 12B and the change angle "a" of the camera (or live camera) 42 that performs real-time rendering inside the CG. Therefore, for the movement of the person M from the position of FIG. 11A to the position of FIG. 11B, it is necessary to estimate the distance "x" traveled by the person M and the distance "z" from the camera sensor device 41 to the person's face (or eyes). Images p1, p2 and camera 42 in FIGS. 12A and 12B correspond to images P1, P2 and camera sensor device 41 in FIGS. 11A and 11B, respectively.

First, if a depth sensor is mounted on the camera sensor device 41 and the distance "z" may be measured, the depth sensor is adopted. If the depth sensor is not installed, in FIGS. 11C and 11D, the distance "z" is calculated by comparison with the eye size "m" extracted by face tracking with respect to the half length "L" of the image captured by the camera sensor device 41. The size of the eye may be defined as the length from the outer corner of the eye to the inner corner of the eye (eye opening). At this time, since the calculated distance differs depending on the lens angle of view of the camera sensor device 41, the coefficient "k" of the camera sensor device 41 is obtained in advance so that the distance "z" calculated from "m" and "L" is the same as the measured distance. The moving distance "x" may be calculated by calculating the moving distance "l" from the center line of the captured image of the camera 41 shown in FIG. 11D to the center of both eyes and adding the above coefficient "k". Next, the angle "θ" from the center of the image display device 40 to the center of both eyes of the person M after movement may be calculated as θ=arctanx/z from tan θ=x/z.

In FIG. 12B, when the moving distance of the camera inside the CG is limited to "D", the moving distance "d" of the camera 42 inside the CG is calculated as d=D/L×1. The angle "α" may be calculated as α=j×θ by considering the coefficient "j" that matches the camera characteristics of the CG (or live camera) with respect to the angle "θ".

Based on the calculated angle "α" and movement distance "d" described above, the visible range of the image displayed on the device 40, that is, the perspective (field of view) may be changed in real time with respect to the movement of the person M. This makes it possible to obtain, for example, a natural experience.

The live camera shoots an outdoor scene through a window from indoors. As described with reference to FIG. 1, images captured by the camera are constantly uploaded to the server and displayed on the display. Live cameras are installed all over the world, and the coefficient "j" varies depending on the camera's angle of view and other characteristics. In conjunction with the display camera 41, the live camera moves and rotates to change the perspective.

FIGS. 12A and 12B show CG images. In a CG image that gives an image as if the camera 42 were moved, the dotted lines radiating out from the virtual camera 42 correspond to the pictures captured by the camera, which are displayed in FIGS. 11A and 11B. The above calculation is performed by moving the virtual camera 42 during CG generation.

According to this embodiment, an image stored inside the image display device 40 or an image obtained from a live camera provided outside is output in CG (for example, the image in FIG. 12A). When the person M is at a predetermined position, the display 1 displays an image limited within a predetermined frame (for example, the image P1 in FIG. 11A). The image moves in conjunction with the movement of the person M, and the hidden image P2 appears. As a result, for example, it is possible to give the user a natural experience in which the range seen through the window changes as if looking into the window.

According to this embodiment, the image display function that changes the visible range and perspective in conjunction with face tracking, may be realized by linking the position and angle of a camera such as a camera for real-time rendering in CG (computer graphics) or a live camera to the human eye line in real time.

In this embodiment, the person M moves laterally parallel to the display 1. The camera 42 may be moved in a vertical direction in accordance with the movement of the person M in the perspective direction in the vertical direction of the display 1. As person M approaches the display, the camera 42 also approaches the frame. A wide-angle field of view including not only the image p1 but also the image p2 may be displayed. When the person M moves away, a narrow-angle field of view may be displayed centering on the image p1. By interlocking the camera 42 with the movement of the person M in another direction, the field of view of the landscape seen through the frame F1 may be varied. The viewer M may experience the view of the outside through the display 1 as if it were an actual window. The display of the display 1 of FIG. 11A may be the default state, displaying the standby state when no one is present, or displaying the end state when no one is present.

In this embodiment, the configuration of the image display device is shown in which the image is linked by tracking the movement of the viewer's face to change the viewable range and perspective, but the configuration is not limited to this. Movement of other parts of the body (such as the head, or the entire body) may be tracked.

Figure 13A:
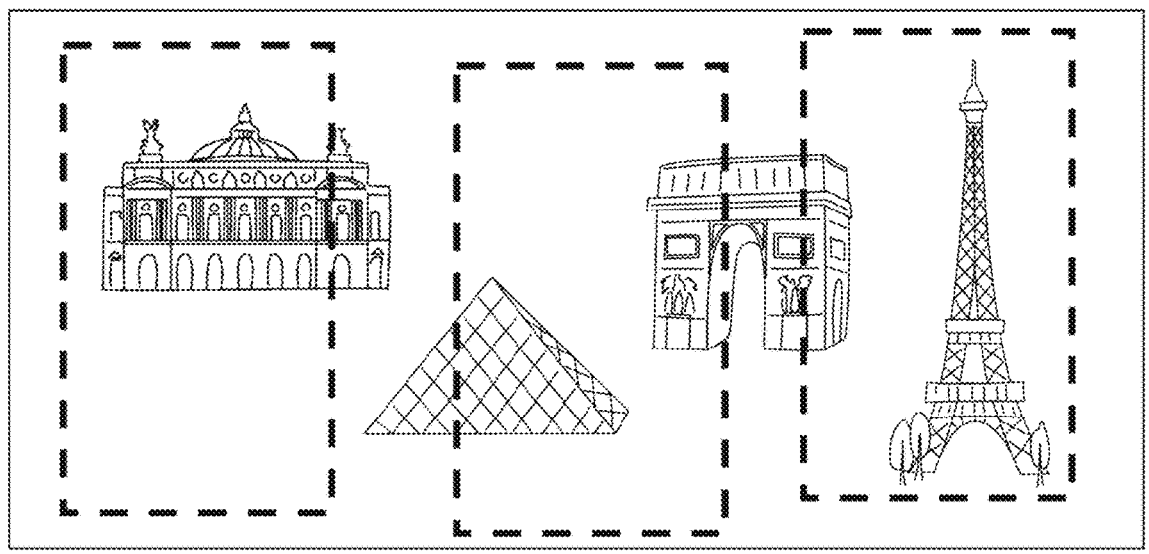
Figure 13B:
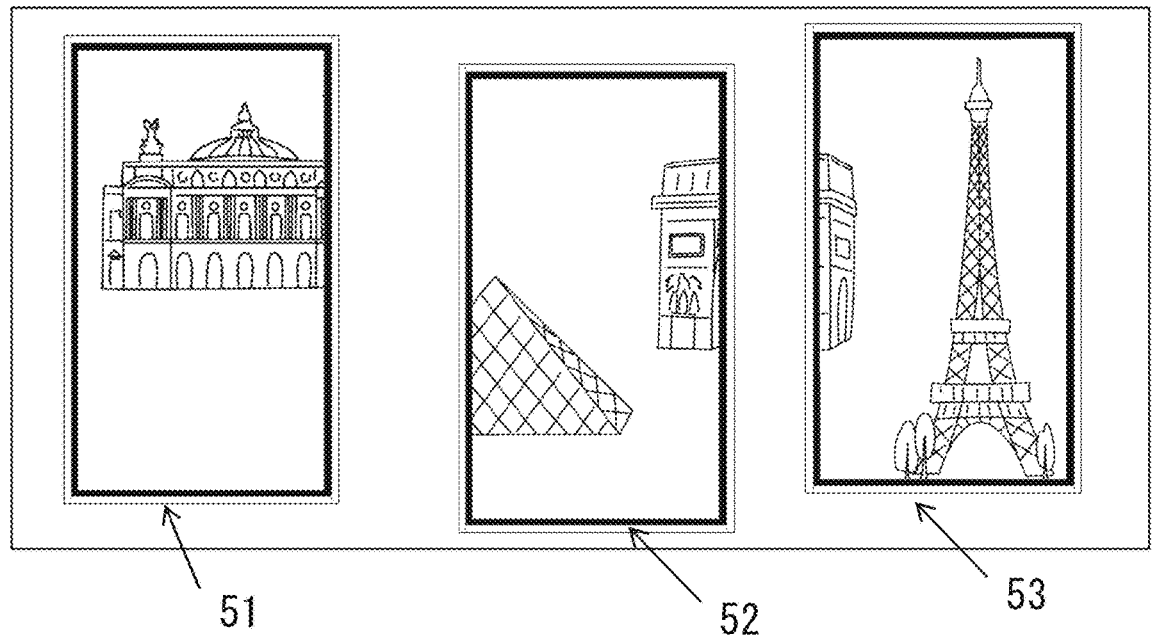

As another embodiment of the present disclosure, FIGS. 13A and 13B show an example of clipping display using position detection of a plurality of displays 51, 52, and 53 and synchronized reproduction of the plurality of displays. FIG. 13A shows an example of clipped display using position detection of the plurality of displays, and FIG. 13B shows an example of synchronized reproduction of the plurality of displays 51, 52, and 53. The displays 51, 52, and 53 may include the video recording/reproducing device (or image display device) 10 having the display 1, and image processing, storing, and reproducing functions such as computer graphics as shown in FIGS. 1 to 3. As the plurality of displays, the example of three displays is described, but the number of displays is not limited to three, and may be applied to two or four or more.

FIG. 13A shows an example of using the relative distance between displays to determine the size or position of the clipped image. In a clipping display method using position detection of the plurality of displays, at least one of the following methods may be used as a clipping position acquisition method.

Method A: Detect the positions of the displays 51, 52, and 53 from the image acquired by an external electronic device equipped with a camera, and calculate the cutout positions of the displays enclosed by the dashed lines in FIG. 13A.

Method B: Using markings as an adjunct to Method A above, calculate the cut-out position of the display, also enclosed by dashed lines.

Method C: Positions are detected from the initial positions of the displays 51, 52, and 53 by moving distances, and the clipping positions are calculated.

Figure 16A:
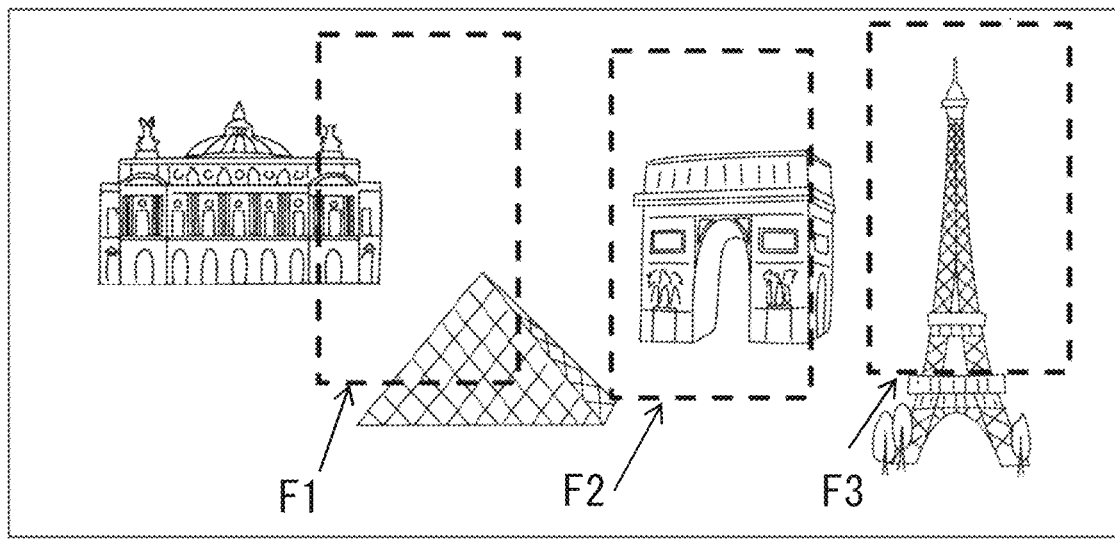

When clipped images are displayed on the plurality of displays 51, 52, and 53 as shown in FIG. 13B, they must be synchronized. In a display example of FIG. 16, as will be described later, a reproducing position information of a leader's display among the plurality of displays may be transferred to the follower's other display(s) via communication such as Bluetooth communication to perform synchronization. In some aspects, the plurality of displays may be synchronized with each other. In data transfer in communication, display synchronization may be achieved by only the difference in communication delay time (latency) that occurs from the issuance of a transfer request until the actual data is sent.

A method of calculating the clipping position from positions of the plurality of displays 51, 52, and 53 will be described for the clipping display using a position detection of the plurality of displays 51, 52, and 53 in FIG. 13A.

The physical positions of the plurality of displays 51, 52, 53 installed on the wall or the like are measured by any of the above Methods A, B, and C, or by position detection by another method. The plurality of displays may have the same size or different sizes.

Figure 14A:
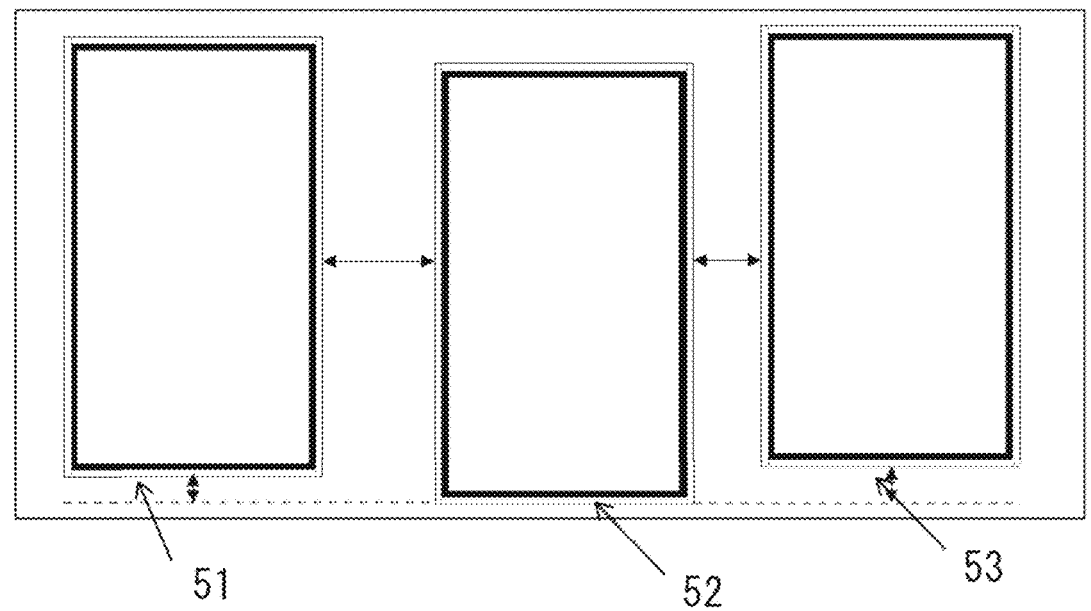
FIG. 14A shows an explanatory diagram of a method of detecting relative distances among a plurality of displays.

The display position may be detected from the image acquired by the electronic device of Method A, and the clipping position may be calculated. First, as shown in FIG. 14A, an image is acquired with a camera such as a smartphone, tablet, or PC. An image including three displays 51, 52, and 53 installed on a wall or the like is acquired using an electronic device capable of processing. Then, from the captured image, the physical positions of the three displays, such as the relative distances between the displays in the image, are detected using methods such as display pattern recognition. An image clipping position is calculated by the electronic device from the acquired position information. The position information of the calculated image clipping position for clipping the image is sent to each display.

Figure 14B:
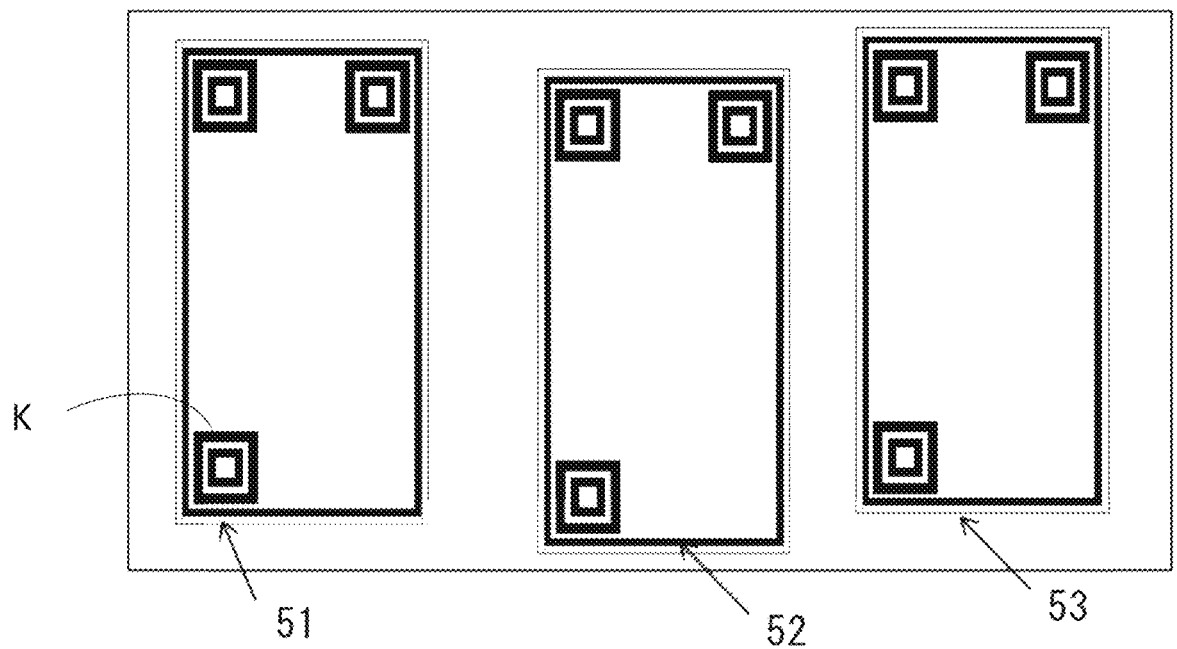
FIG. 14B shows an explanatory diagram of another method of detecting relative distances among the displays.

Referring to FIG. 14B, Method B, which uses markings to calculate the relative distance between displays 51, 52, and 53 as an aid to Method A above, will now be described. As an aid to the display position detection method of Method A, a dot or a symbol K or the like may be placed on a wall or the like or displayed on a display, and used as marking. The electronic device utilizes markings in images captured by cameras to provide more accurate physical location detection of the plurality of displays.

Figure 15A:
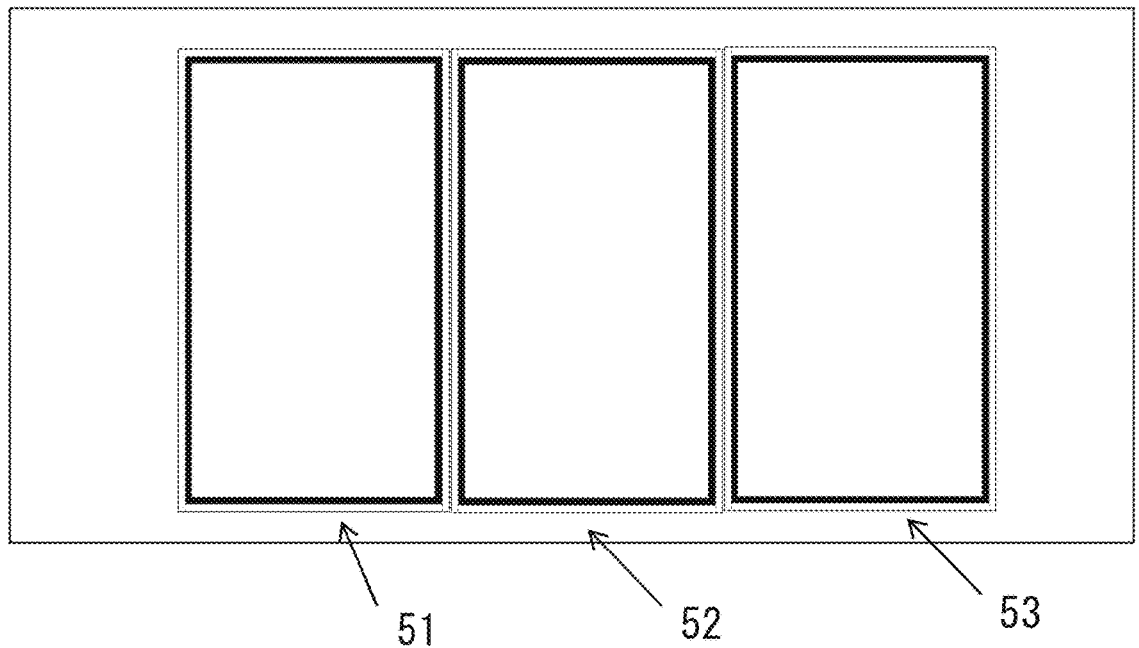

Referring to FIG. 15A, Method C of detecting the physical position from the movement distance from the initial position will be described. First, for example, as shown in FIG. 15A, three displays 51, 52, and 53 are placed in a predetermined initial position state, for example, by arranging them side by side with their vertical centers aligned, and each display store the initial relative position.

Figure 15B:
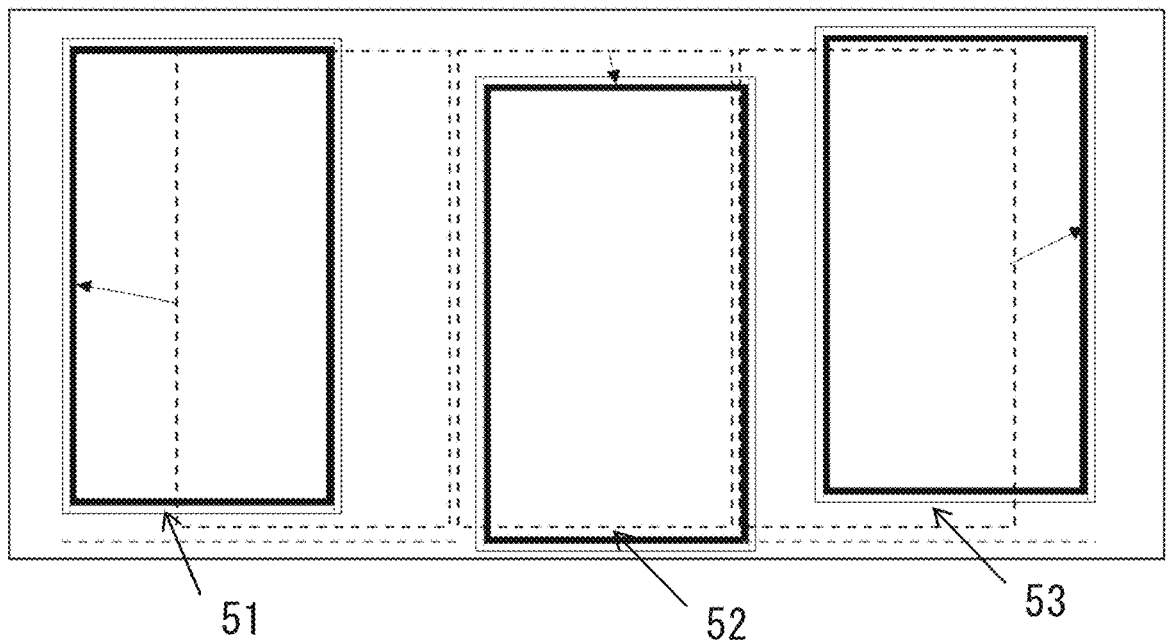

Next, as shown in FIG. 15B, each of the displays 51, 52, and 53 is moved from the initial position to a desired position. In this case, each of the displays 51, 52, and 53 may be configured to include an acceleration sensor, calculate the movement distance by detecting acceleration, and detect the movement distance of itself from the initial state. A relative position of each display may be calculated from the detected movement distance. The clipping position of the image may be calculated from the stored initial position and the position after movement, and the clipped image may be displayed.

Figure 16B:
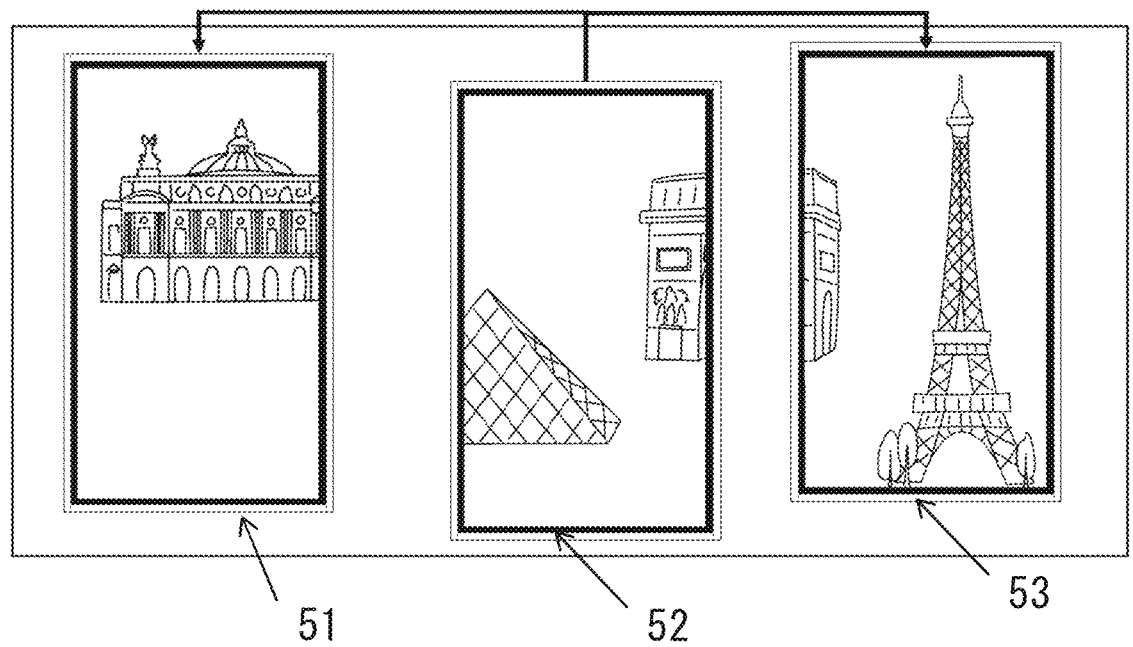

In this embodiment, the size of the image may be set arbitrarily when calculating the clipping position of the image by the position detection methods A, B, and C. By changing the magnification of the clipped image while maintaining the relative positions and size ratios of frames F1, F2, and F3 enclosed by dashed lines in FIG. 16A, the relative positional relationship of the clipping positions does not change. This is used to calculate where to cut. By sharing the calculated clipping position among the plurality of displays, the clipped image may be displayed as shown in FIG. 16B.

Next, referring to FIG. 16B, a method of synchronizing and reproducing plurality of displays 51, 52, and 53 will be described. When the medium to be displayed is a video, each display needs to synchronize the reproducing positions of the video with each other while displaying the clipped image. For this purpose, for example, one display 52 out of the plurality of (three) displays 51, 52, and 53 is set as the leader. The leader display 52 transfers its own reproducing position information to a plurality of other displays 51 and 53 which are followers via communication such as Bluetooth communication. When the follower's displays 51 and 53 receive the reproducing position information from the leader display 52, the same video is clipped and displayed on each display, and the video reproducing position is adjusted to the leader's reproduction position. The leader display 52 may reproduce video synchronized with the follower's displays 51 and 53 only with a difference due to communication delay by periodically sending reproduction position information. In other words, the video reproducing position of the leader display may be shared with the display of the follower, and synchronized video may be reproduced.

The image display system of this embodiment includes a plurality of arbitrarily arranged displays, an electronic device equipped with a camera for acquiring an image including the plurality of displays, and a position detection unit of detecting the positions of the plurality of displays in the acquired image, and a display unit of clipping images from a plurality of detected display positions to be displayed on the displays. As described in the above described embodiments, the position detection unit and the display unit t may be realized by the devices and computer graphics processing as shown in FIGS. 1, 3, 5 and 6.

In this embodiment, a plurality of displays are arranged at the user's preferred positions, and an image obtained by cutting out the image of the landscape with the frame of each display is displayed on each display. Thereby, for example, it is possible to provide the user with a natural experience of viewing the landscape by providing a virtual window on the wall. By combining with the face tracking embodiments of FIGS. 11 and 12, it is possible to provide images in which images hidden in blind spots of the display (virtual window) appear as the viewer moves in front of the display. By combining with other embodiments, for example, the image display system of this embodiment may provide the user with more comfortable viewing. This embodiment is not limited to landscape images, and may be applied to general images as well.

Figures 17A, 17B:
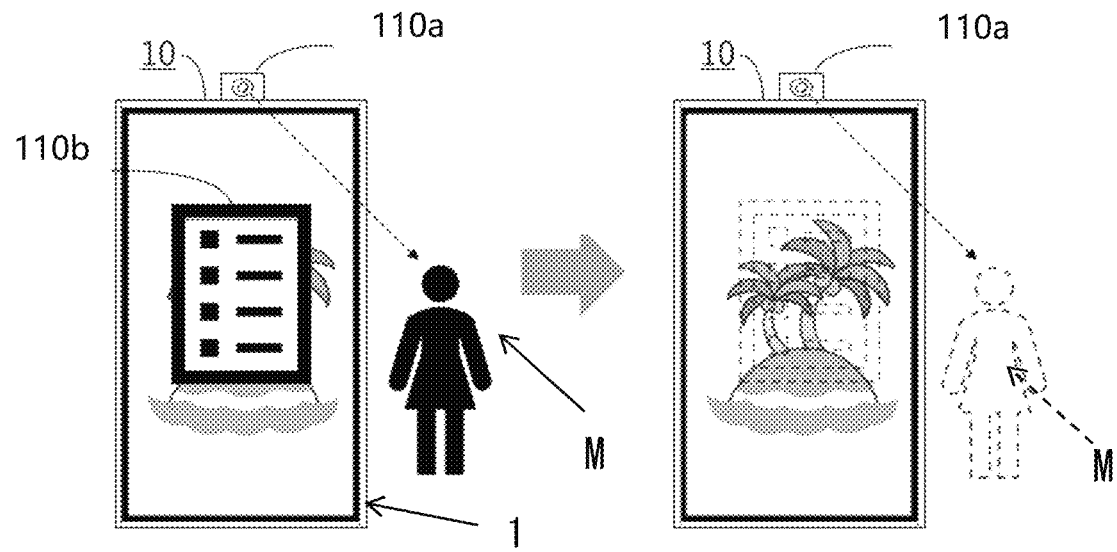

For example, as an embodiment of the present disclosure, FIGS. 17A and 17B show a front view of an image display device 10 having a unit of switching display upon detecting that a user M is absent from a vicinity. As an example, in FIG. 17A, a display 1 provided in the image display device 10 displays a menu 110*b* when the user M is nearby. When a camera 110*a* attached to the device 10 detects that the user M has left the front of the display 1 as shown in FIG. 17*b*, the display 1 closes the menu 110*b* and displays a steady landscape. If necessary, the image display device 10 is equipped with a unit that acquires external weather data, and switches the steady landscape to a rainy landscape when it rains outside as described in the embodiment of FIG. 8A. Also, the landscape may be displayed according to an external weather such as sunny, cloudy, rainy, and snowy. Also, instead of the camera, a non-contact proximity sensor may be provided if necessary. The image display device 10 also has a unit of switching display upon detecting that the user M has approached nearby. For example, when the camera 110*a* detects that the user M has approached the device 10 of FIG. 17A from the position of FIG. 17B, the display 1 is switched to the menu 110*b*. Alternatively, the display 1 may be switched to a predetermined image according to the close distance from the display 1 by the user.

Figures 18A, 18B:
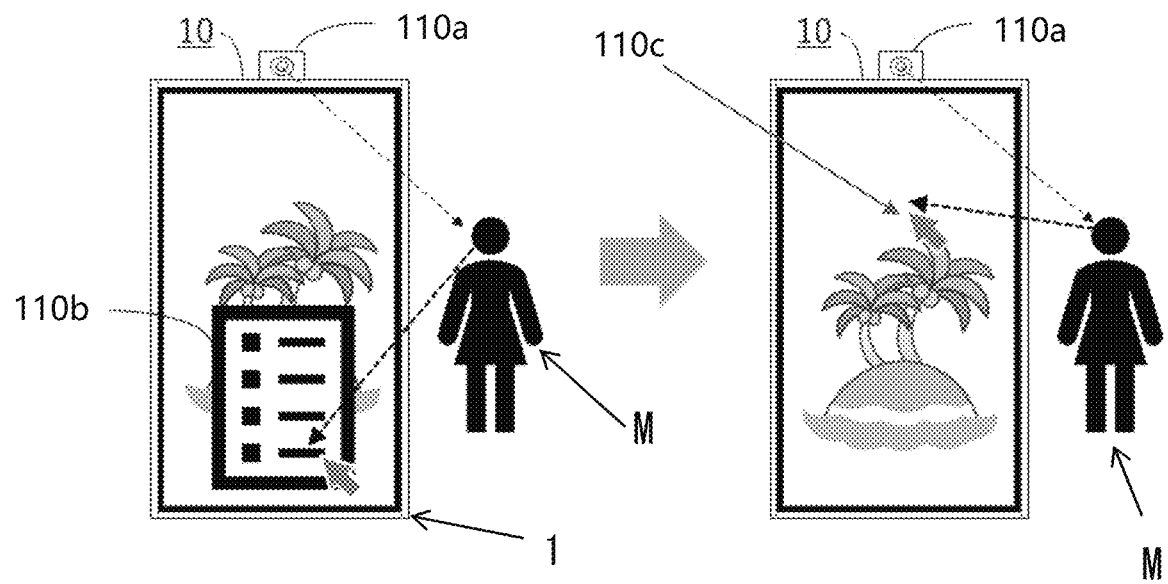

Also, as an embodiment of the present disclosure, FIGS. 18A and 18B show an image display device 10 having an estimation unit of estimating where on a screen a user M is looking. The device 10 has the estimation unit of estimating where on a screen of the display 1 a line-of-sight of the user M is looking based on the image and display content acquired by a camera 110*a* provided in the device 10 or the camera shown in the embodiment of FIG. 11.

As an example, in FIG. 18A, the device 10 is provided with a unit of assuming that the user M is paying attention to an item selected in a menu 110*b*, and tracks and estimates a specific line-of-sight position of an image indicated by an arrow mark 110*b* from the image acquired by the accompanying camera 110*a* by the estimation unit, whereby the menu 110*b* is turned off and the estimated position of the menu is displayed by an arow mark 110*c* as shown in FIG. 18B. Alternatively, as shown in FIG. 3B, the device 10 may be constructed so that the images b2 to b5 are selectively displayed based on the line-of-sight estimated position of the menu screen b1.

Figure 19:
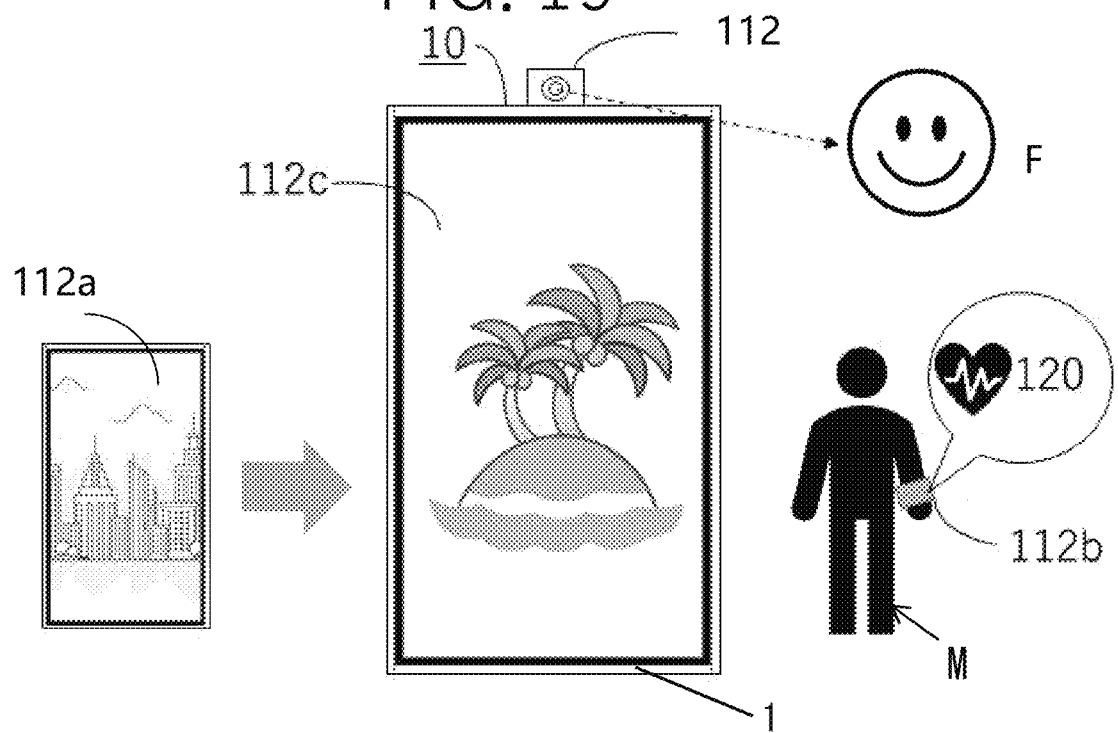
FIG. 19 shows a front view of an image display device that reads a psychological state of a nearby person and displays a related image as one embodiment of the present disclosure.

Also, as an embodiment of the present disclosure, FIG. 19 shows an image display device 10 having a unit of reading and displaying a mental state of an user M. The device 10 includes a camera 112 that captures a face F of the user M, an input unit (not shown) wirelessly connected to a biosensor attached to the user M, and further a display unit of displaying image data according to a user's psychological state. As an example, an image of landscape 112a is normally displayed. The device 10 includes a unit (not shown) for detecting a facial expression F and a behavior of the user M obtained from the camera 112 or determining a mood from an input from a vital sensor 112b to present and display a cheerful scenery 112c such as a tropical scenery, when the mental state of the user M is positive and uplifted, This embodiment may be used for health management to know one's own physical condition by showing images that match people's emotions. The vital sensor 112b may be a any wearable sensor capable of detecting data necessary for health care. If desired, the camera 112 may be constructed to have a wireless body temperature sensor detect.

Figure 20A:
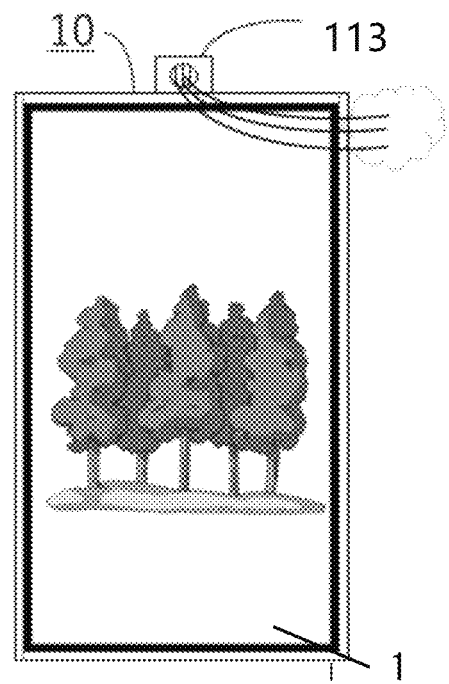
FIG. 20A shows a front view of an image display device having an air cleaning unit disposed on a top of the device as one embodiment of the present disclosure.

As another embodiment of the present disclosure, FIG. 20A shows a front view of an image display device 10 having an air cleaning unit 113 disposed on a top of the device. The air cleaning unit 113 has a function of blowing air and cleaning the air, this reminds a user of a ventilation function of a general window since the image display device 10 is a window-type smart display. The air cleaning unit 113 may have a deodorizing function..

Figure 20B:
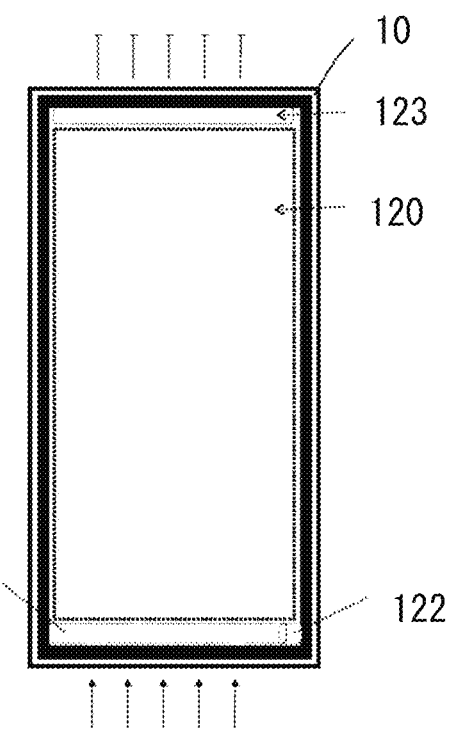
FIG. 20B shows a rear view of an image display device having an air cleaning unit disposed on a rear side of the device as a modification of the devoice of FIG. 20A.

FIG. 20B shows a rear view of an image display device 10 having an air cleaning unit disposed on a rear side of the device as a modification of the device 10 of FIG. 20A. The image display device 10 includes an air cleaning layer 120, an exhaust unit 123 placed above the air cleaning layer 120, and a rotary blower fan 121 placed below the air cleaning layer 120, which are disposed on a back of a liquid crystal display panel 1 of the device 10. A motor 122 is arranged for rotating the blower fan 121. The fan 121 is rotated by driving the motor 122 to suck outside air into the inside of the device 10 through an inlet (not shown) provided at the bottom of the device 10. The sucked outside air flows upward by the fan 121 and sequentially passes through a rear surface of the liquid crystal panel and enters the air cleaning layer while being cooled. If necessary, the exhaust unit 123 may be provided in the lower part of the device 10, and the structure may be such that outside air is sucked from the upper part of the device. This not only purifies the air but also cools off the heat generated by the liquid crystal display panel 1.

The air cleaning layer 120 may have a structure in which an air purifying filter is provided in the upper air hole and/or the lower air hole, regardless of the shape of the figure. If necessary, the air cleaning layer 120 may be omitted, and the device 10 may be provided with a cooling fan for cooling purposes only. Alternatively, the air cleaning unit may be a window type air conditioner (not shown), and the image display device 10 may be attached to the front surface of the air conditioner. If desired, the image display device 10 may have a deodorizing function or an ozone effect function.

The video recording/reproducing devices, and the image display devices 10 shown in FIGS. 1 to 16 may selectively include the image display devices shown in FIGS. 17 to 20 so as to change an image in conjunction with movement of a person. For example, a system may be adopted in which a plurality of image display devices 10 shown in FIG. 17 are arranged along the line of the person, and the menu is displayed only on the image display device 10 in front of the person according to the movement of the person.

Although the embodiments of the present disclosure have been described with reference to FIGS. 1 to 20, the present disclosure, as described above, is not limited to each embodiment and includes combination with one or more other embodiments as necessary.

The present disclosure is illustrative in all respects, and the scope of the present disclosure includes all modifications within the meaning and range of equivalents of the claims. For example, the landscape video recording/reproducing system is not limited to a video recording/reproducing system, but includes a display device, an image display device, or an image reproducing (or video player) system, device, and method that do not have a recording function, and the image display device includes an image recording device, system, and method.

While some embodiments and examples of the present disclosure have been described above, these embodiments and examples are illustrative of the present disclosure. For example, each of the above embodiments has been described in detail for easy understanding of the present disclosure, and additional changes in dimensions, configurations, materials, and circuits may be made as necessary. Note that embodiments in which one or more of the features of the present disclosure listed above are arbitrarily combined are also included within the scope of the present disclosure. The claims encompass numerous variations to the embodiments without departing from the spirit of the disclosure. Accordingly, the embodiments and examples disclosed herein are presented for purposes of illustration and should not be considered as limiting the scope of the disclosure.

What is claimed is:

1. An image display method using an image display device the image display device including:
   a plurality of arbitrarily arranged displays;
   an electronic device acquiring images of the displays;
   a unit for detecting positions of the plurality of displays from the acquired images; and
   a unit for clipping an image by using the detected display positions to be displayed on the the method comprising:
   detecting positions of the plurality of arbitrarily arranged dis plays in an image acquired from the outside;
   clipping an image by using the detected display positions; and
   displaying the clipped images on a display at each detected position,
   wherein at least one of the plurality of displays is said image display device having a memory configured to perform processes of: reading video data stored in a video memory and/or video data stored on an internet; decoding the read video data according to a format of the video data; storing the decoded frame image in a random access memory for each video frame; performing first image processing on the frame image stored in the random access memory to be stored in a video memory;
   performing second image processing on the frame image stored in the video memory; and displaying the frame image on the image display device in order in each video frame.

2. The image display method according to claim 1, wherein the clipped images on a display at each detected position are synchronously displayed.

3. An image display method using an image display device having:
- an external input interface;
- a memory for storing image data;
- a processing unit;
- a graphics processing unit;
- a display for displaying images;
- a setting mode suitable for a user;
- displaying an image suitable for the user, wherein the setting mode suitable for the user is to arbitrarily arrange a plurality of displays, the method comprising:
- detecting positions of a plurality of arbitrarily arranged displays in an image acquired from the outside;
- clipping an image by using the detected display position; and
- synchronously displaying the clipped images on a display at each detected position.

4. The image display method according to claim 3, further comprising:
- setting one of the plurality of displays as a leader display and setting the other display as a follower display;
- transferring a reproducing position information of the leader display to the follower display;
- clipping and displaying the same image on each of the plurality of displays when the follower display receives the information on the reproducing position from the leader display.

5. An image display device comprising:
- an external input interface;
- a memory for storing image data;
- a processing unit;
- a graphics processing unit;
- a display for displaying images;
- a setting mode suitable for a user;
- a plurality of displays that are arbitrarily arranged;
- an electronic device that acquires an image including the plurality of displays;
- a unit for detecting the position of the plurality of displays in the acquired image; and
- a unit that clips images from the detected positions of the plurality of displays and displays them on the displays.

6. An image display method using the image display device according to claim 5, the method comprising:
- detecting positions of the plurality of arbitrarily arranged displays in an image acquired from the outside;
- clipping an image by using the detected display positions; and
- synchronously displaying the clipped images on a display at each detected position.

7. The image display method according to claim 6, comprising:
- displaying a desired landscape on at least one display of the plurality of displays;
- setting spatial information of the landscape;
- receiving an external notification;
- mapping the external notification to an insertable object in the video space; and
- dynamically inserting the object into the video.

8. The image display method according to claim 6, comprising:
- recognizing a position of a viewer in front of the display; and
- changing display image of the display in conjunction with movement of a viewer's predetermined part.

9. The image display device according to claim 5, wherein at least one of the plurality of displays is an image display device, the image display device comprising:
- the display for displaying images,
- a camera that recognizes a position of a viewer in front of the display; and
- a computer graphics generation unit of generating an image of the display;
- wherein the display image of the display is moved in conjunction with movement of a viewer's predetermined part.

10. The image display device according to claim 5, comprising:
- at least one display of the plurality of displays displaying a desired landscape;
- a unit of setting spatial information of the landscape;
- a unit that receives a notification from the outside;
- a unit of mapping the external notification to an object that is insertable into a video space; and
- a unit that dynamically inserts the object into image of the landscape.

11. An image display device comprising:
- an external input interface;
- a memory for storing image data;
- a processing unit, a graphics processing unit;
- a display for displaying images; and
- a setting mode suitable for a user,
- a unit for setting spatial information of a desired landscape;
- a unit for receiving an external notification;
- a unit for mapping the external notification to an object insertable into a video space; and
- a unit for dynamically inserting the object into a video.

12. An image display method using an image display device according to claim 11, the method comprising:
- displaying the desired landscape on the display;
- setting spatial information of the desired landscape;
- receiving external notification;
- mapping the external notification to the object insertable into the video space; and
- dynamically inserting the object into the video.

13. The image display method according to claim 12, wherein the object is a moving image.

14. The image display method according to claim 12, wherein at least one of fade-in, slide-in, and slow-in is selectively set for the dynamic insertion of the object.

15. An image display device comprising
- an external input interface;
- a memory for storing image data;
- a processing unit;
- a graphics processing unit;
- a display for displaying images;
- a setting mode suitable for a user, wherein the setting mode suitable for the user is an image quality improvement mode; and
- an internet interface for reading video data stored on an internet, a decoding chip and a video memory, wherein the image display device is configured to read video data stored in the memory and/or the internet, decode the read video data by the decoding chip according to a format of the video data, store frame images decoded into each video frame in the video memory, and sequentially display the frame images stored in the video memory on the display for each video frame.

16. An image display method using the image display device according to claim 15 further including a random access memory for storing the decoded frame image, the method comprising:

displaying an image suitable for the user;

reading video data stored in the memory and/or video data stored on the internet;

decoding the read video data into a frame image according to a format of the video data;

storing the decoded frame image in the random access memory in order of each video frame;

first image processing the frame image stored in the random access memory and storing the first image-processed frame image in the video memory;

second image processing the frame image stored in the video memory; and sequentially displaying the frame image stored in the video memory on the display for each video frame.

17. The image display method according to claim 16, in which the image display device includes a virtual window display that displays an image as if the landscape is reflected in the window, further including synthesizing a predetermined favorite glass window image with a landscape image.

18. An image display method using an image display device including an external input interface, a memory for storing image data, a processing unit, a graphics processing unit, a display for displaying images, a setting mode suitable for a user, a recognition camera, and a computer graphics generation function, the method comprising:

recognizing a position of a viewer in front of the display by the recognition camera;

moving a display image of the display in conjunction with the movement of a predetermined part of the viewer;

tracking the movement of the viewer's predetermined part and setting a virtual camera of the recognition camera on a computer graphic so as to match the position of the viewer; and displaying on the display a landscape image seen from the virtual camera.

* * * * *